(12) United States Patent
Hosaka et al.

(10) Patent No.: US 11,712,763 B2
(45) Date of Patent: Aug. 1, 2023

(54) DEVICE FOR CUTTING STRUCTURE AND METHOD FOR CUTTING STRUCTURE

(71) Applicant: KOBELCO CONSTRUCTION MACHINERY CO., LTD., Hiroshima (JP)

(72) Inventors: Yoshinobu Hosaka, Hiroshima (JP); Daisuke Muraoka, Hiroshima (JP); Takanori Yamasaki, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 911 days.

(21) Appl. No.: 16/499,682

(22) PCT Filed: Mar. 20, 2018

(86) PCT No.: PCT/JP2018/011113
§ 371 (c)(1),
(2) Date: Sep. 30, 2019

(87) PCT Pub. No.: WO2018/186171
PCT Pub. Date: Oct. 11, 2018

(65) Prior Publication Data
US 2021/0187674 A1    Jun. 24, 2021

(30) Foreign Application Priority Data

Apr. 7, 2017  (JP) .................. 2017-077126

(51) Int. Cl.
*B23K 37/02*    (2006.01)
*B23K 37/04*    (2006.01)
(Continued)

(52) U.S. Cl.
CPC .......... *B23K 37/0288* (2013.01); *B23K 7/002* (2013.01); *B23K 7/005* (2013.01);
(Continued)

(58) Field of Classification Search
CPC ................ B23K 2103/04; B23K 37/02; B23K 37/0288; B23K 37/0294; B23K 37/0435;
(Continued)

(56) References Cited

U.S. PATENT DOCUMENTS 3,918,476 A * 11/1975 Jasinski ............... A01G 23/089
144/34.5
5,478,019 A * 12/1995 Morikawa ............. E04G 23/082
241/266
(Continued)

FOREIGN PATENT DOCUMENTS

EP    0 678 354 A1    10/1995
JP    6-313365 A    11/1994
(Continued)

OTHER PUBLICATIONS

Extended European Search Report dated Feb. 13, 2020 in European Patent Application No. 18780908.2, 10 pages.
(Continued)

*Primary Examiner* — Jessee R Roe
*Assistant Examiner* — Michael Aboagye
(74) *Attorney, Agent, or Firm* — Oblon, McClelland, Maier & Neustadt, L.L.P.

(57) ABSTRACT

A cutting device capable of efficiently cutting an object with a simple configuration includes a grasp unit including a first grasper and a second grasper movable in an opening and closing directions to grasp the object, a cutting unit disposed side by side with the first and second graspers and moved in a cutting direction along the opening and closing directions to cut the object, and a position setter setting a cutting start
(Continued)

position and a cutting end position based on respective positions of the first and second graspers that are grasping the object, respectively.

8 Claims, 14 Drawing Sheets

(51) Int. Cl.
*E02F 3/96* (2006.01)
*E04G 23/08* (2006.01)
*B23K 7/10* (2006.01)
*B23K 7/00* (2006.01)
*B23K 103/04* (2006.01)

(52) U.S. Cl.
CPC ............... *B23K 7/10* (2013.01); *B23K 7/105* (2013.01); *B23K 37/02* (2013.01); *B23K 37/0294* (2013.01); *B23K 37/0435* (2013.01); *B23K 37/0452* (2013.01); *E02F 3/965* (2013.01); *E04G 23/082* (2013.01); *B23K 2103/04* (2018.08)

(58) Field of Classification Search
CPC .... B23K 37/0452; B23K 7/002; B23K 7/005; B23K 7/10; B23K 7/105; E02F 3/965; E04G 23/082

USPC ........ 241/101.73, 266, 198.1; 294/99.1, 106, 294/196, 198; 414/739, 680, 650, 729; 219/121.39

See application file for complete search history.

(56) References Cited

U.S. PATENT DOCUMENTS

| 5,704,560 | A | * | 1/1998 | Wimmer | ................. | E02F 3/965 |
| | | | | | | 241/101.73 |
| 7,306,177 | B2 | * | 12/2007 | Ward | ..................... | E02F 3/965 |
| | | | | | | 241/266 |

FOREIGN PATENT DOCUMENTS

| JP | 2005-2688 A | | 1/2005 | | |
| JP | 2007-146571 A | | 6/2007 | | |
| JP | 2009-84939 A | | 4/2009 | | |
| JP | 2011-64025 A | | 3/2011 | | |
| JP | 2013-23940 A | | 2/2013 | | |
| JP | 2014-201932 A | | 10/2014 | | |
| JP | 2015-4238 A | | 1/2015 | | |
| JP | 2016102347 | * | 6/2016 | ............ | B23K 7/002 |
| JP | 2017-8542 A | | 1/2017 | | |
| WO | WO 2008/114963 A1 | | 9/2008 | | |

OTHER PUBLICATIONS

International Search Report dated May 22, 2018 in PCT/JP2018/011113 filed Mar. 20, 2018.

* cited by examiner

US 11,712,763 B2

DEVICE FOR CUTTING STRUCTURE AND METHOD FOR CUTTING STRUCTURE

TECHNICAL FIELD

The present invention relates to a device used to cut a cutting object such as a steel member and a method for cutting the cutting object.

BACKGROUND ART

Examples of known methods for cutting a cutting object such as a steel member include a method of cutting the cutting object by using a hydraulic cutter mounted on a construction machine such as a hydraulic excavator. However, this method has a limit for the size of a steel member or the like to be cut by the method; therefore, there can be a case of failing to completely cut a large steel member used in a large-scale structure or the like. In this case, performed is cutting a cutting object as deeply as possible by use of a hydraulic cutter or cutting down to some extent manually by a worker with a gas cutting machine and then twisting off it by use of a hydraulic cutter or the like. The former case has a possibility of failing to make a cut in the steel member by a sufficient depth to thereby cause an excessive load on the hydraulic cutter to twist off the steel member, which may shorten the life of the working device. The latter case involves a problem of forcing the worker to work at a high and unstable location.

As means for solving the above-described problems, for example, Patent Literature 1 discloses a cutting device including: a plurality of steel clumps (grasp unit) axially spaced to support a steel member to be cut; a plurality of cutting tools; a moving means for moving the plurality of cutting tools along a slide frame, and a controller to which the size and other information of the steel member is input in advance. The controller moves the cutting device through remote control in the axial direction, the transverse direction, and the height direction of the steel member to enable the cutting device to cut the steel member.

Besides, Patent Literature 2 discloses a demolition attachment including: a holding device provided to a distal end of a boom of a construction machine to hold a cutting object; a shifter attached to a frame of the holding device, and a cutting device mounted on the moving device and including a cutting torch. The shifter moves the cutting device relatively to the holding device to allow the cutting device to cut a steel member that is held by the holding device.

The cutting device disclosed in Patent Literature 1, however, requires the size and other information of the steel member to be input in advance to the controller for controlling the operation of the cutting device. Moreover, the plurality of cutting tools has to make respective individual and independent movements of each other, which makes the operation thereof difficult and generates necessity of a complex mechanism and structure.

The demolition attachment disclosed in Patent Literature 2, in which respective positions at which the cutting device starts and stops a cutting operation cannot be specified, has a possibility of needless operation of the cutting device.

CITATION LIST

Patent Literature

Patent Literature 1: Japanese Unexamined Patent Publication No. 2007-146571

Patent Literature 2: Japanese Unexamined Patent Publication No. 2005-002688

SUMMARY OF INVENTION

It is an object of the present invention to provide a device and a method for efficiently cutting a cutting object to be cut.

To achieve the above-mentioned object, the inventors of the present application have come up with the idea of detecting the position of a cutting object by utilization of a grasp unit that grasps the cutting object and make use of the detected position in positioning a cutting unit.

Provided is a cutting device for cutting a cutting object included in a structure, the cutting device comprising: a grasp unit including a first grasper and a second grasper that are movable in an opening and closing directions, in which direction the first grasper and the second grasper come close to each other or go away from each other, to grasp the cutting object therebetween in the opening and closing directions; a drive mechanism that moves the first grasper and the second grasper relatively to each other in the opening and closing directions; a cutting unit disposed side by side with the first grasper and the second grasper and configured to cut the cutting object with movement of the cutting unit in a cutting direction along with the opening and closing directions; a main unit supporting the first and second graspers movably in the opening and closing directions and supporting the cutting unit movably in the cutting direction; a feed mechanism that moves the cutting unit in the opening and closing directions; and a position setting means that sets a cutting start position and a cutting end position based on respective positions of the first grasper and the second grasper that are grasping the cutting object, respectively. The cutting start position is a position at which an operation of the cutting unit and the movement of the cutting unit for cutting the cutting object are started, and the cutting end position is a position at which the operation of the cutting unit and the movement of the cutting unit for cutting the cutting object are ended. The limitation "sets a cutting start position and a cutting end position based on respective positions of the first grasper and the second grasper" does not necessarily require that the cutting start position exactly agrees with the position of the first grasper and the cutting end position exactly agrees with the position of the second grasper, but encompasses the aspect to set the cutting start position to allow the operation of the cutting unit is started at a position slightly before the position of the first grasper and the aspect to set the cutting end position to allow the operation of the cutting unit to be stopped at a position slightly ahead of the position of the second grasper.

Also provided is a method for cutting a cutting object included in a structure by using a cutting device, the method comprising: a cutting device preparation step of preparing the cutting device that includes a grasp unit including a first grasper and a second grasper that are movable in an opening and closing directions, in which direction the first grasper and the second grasper come close to each other or go away from each other, to grasp the cutting object therebetween in the opening and closing directions, a drive mechanism that moves the first grasper and the second grasper relatively to each other in the opening and closing directions, a cutting unit disposed side by side with the first grasper and the second grasper to cut the cutting object with a movement of the cutting unit in a cutting direction along with the opening and closing directions, a main unit supporting the first and second graspers movably in the opening and closing directions and supporting the cutting unit movably in the cutting direction, and a feed mechanism that moves the cutting unit in the opening and closing directions; a grasp unit positioning step of positioning the cutting device to locate the cutting object between the first grasper and the second grasper; a grasping step of moving the first grasper and the second grasper relatively to each other in a closing direction that is one of the opening and closing directions, the first grasper and the second grasper coming close to each other in the closing direction, to thereby cause the first grasper and the second grasper to grasp the cutting object; a position setting step of setting a cutting start position based on the position of the first grasper and setting a cutting end position based on the position of the second grasper when the first grasper and the second grasper are grasping the cutting object; a cutting unit positioning step of causing the feed mechanism to move the cutting unit in the opening and closing directions to position the cutting unit at the cutting start position; and a cutting step of causing the feed mechanism to move the cutting unit from the cutting start position to the cutting end position to cut the cutting object.

DESCRIPTION OF EMBODIMENTS

Below will be described embodiments of the present invention with reference to the accompanying drawings. It should be understood that the preferred embodiments described hereinafter are merely illustrative, and are not intended to limit the scope, application and use of the present invention in any way.

Figure 1:
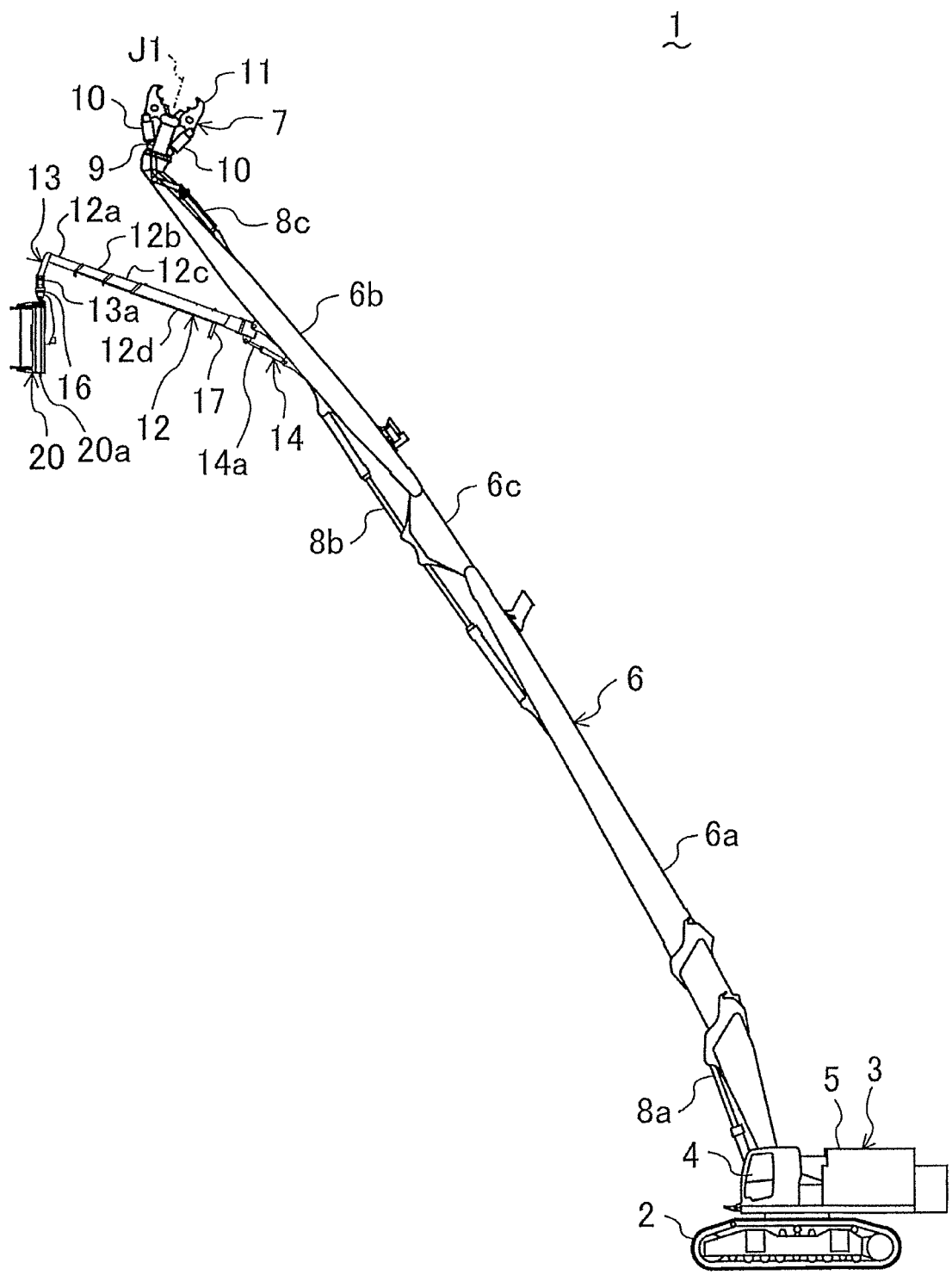
FIG. 1 is a schematic side view of a demolition machine to which a cutting device according to a first embodiment of the present invention is attached.

FIG. 1 shows a demolition machine 1 according to a first embodiment 1 of the present invention. The demolition machine 1 includes: a lower travelling body 2; un upper slewing body 3 mounted on the lower travelling body 2 so as to be slewable; a boom 6; a crushing device 7; and a cutting device 20 that is an example of a cutting device according to the present invention. On the upper slewing body 3 are mounted a cab 4 and a machine room 5. The boom 6 is attached to a front part of the upper slewing body 3 in a raisable and lowerable manner. The crushing device 7 is detachably attached to a distal end of the boom 6. In the present invention, directional terms such as "front and rear direction" "vertical direction" and "left and right directions", unless otherwise specified, refer to the front and rear direction, the vertical direction, and the left and right directions when viewed by an operator seated in the driver's cab 4 of the demolition machine 1 who is facing forward.

The boom 6 according to this embodiment includes a first boom member 6a having a proximal end attached to the front part of the upper slewing body 3 in a raisable and lowerable manner and a distal end opposite to the proximal end, a second boom member 6b having a proximal end and a distal end opposite thereto, the crushing device 7 being detachably attached to the distal end, and a coupling member 6c coupling the proximal end of the second boom member 6b to the distal end of the first boom member 6a in a raisable and lowerable manner. The first boom member 6a is raised and lowered through extension and retraction of a boom cylinder 8a, and the second boom member 6b is raised and lowered through extension and retraction of a boom cylinder 8b. The crushing device 7 is brought into vertical rotational movement about a horizontal axis by extension and retraction of the working cylinder 8c.

The crushing device 7 includes, for example, a crusher body 9 detachably attached to the distal end of the second boom member 6b, a pair of hydraulic cylinders 10, 10 connected to the crusher body 9 through a not-graphically-shown rotary mechanism, and a pair of crusher claws 11 supported on the crusher body 9 rotatably about an axis J. The paired hydraulic cylinders 10 is extended and retracted to thereby move respective proximal ends of the paired crusher claws 11, respectively, in a direction in which the paired crusher claws 11 come close to each other or go away from each other, thereby moving respective distal ends of the paired crusher claws 11 in opening and closing directions. Being moved in the opening and closing directions, the crusher claws 11 make crushing actions such as grasping a cutting object T shown in FIG. 7, for example, a steel member, or twisting off the cutting object T while grasping it.

To be used for cutting the cutting object T, the cutting device 20 is connected to the second boom member 6b through an arm 12 and a suspension support member 13. The arm 12 includes a proximal end coupled to the second boom member 6b in a raisable and lowerable manner and a distal end opposite to the proximal end. The cutting device 20 includes a proximal end to be attached to the distal end of the arm 12. In the first embodiment 1, illustrated as the cutting object T is an H-section steel member including a web and a pair of flanges. The cutting object T, however, is not limited to an H-section steel member but permitted to be other steel materials. In addition, the cutting object according to the present invention is not limited to a steel member.

The arm 12 includes, for example, four cylindrical members 12a to 12d forming a telescopic structure. The cylindrical members 12a to 12d are aligned in this order from their distal end. With regard to adjacent ones of the cylindrical members 12a to 12d, the tubular member on the proximal side has a greater diameter than that of the tubular member on the distal side. The arm 12 is attached with not-graphically-shown telescoping means, which moves the tubular members 12a to 12d relatively to each other in a retracting direction such that the tubular members 12a to 12c are retracted into their respective adjacent tubular members 12b to 12d on the proximal side thereof, thereby shortening the entire arm 12; in contrast, the telescoping means moves the tubular members 12a to 12d relatively to each other in a direction such that the tubular members 12a to 12c are protruded to the distal side from the respective adjacent tubular members 12b to 12d located on the proximal side, thereby lengthening the entire arm 12. The tubular member 12d located at the rearmost end and having the largest diameter has a rear end, which is connected to a lower surface of the second boom member 6b rotatably, for example, through a not-graphically-shown pin.

The tubular member 12d is connected with an arm cylinder 14 to raise and lower the arm 12. The arm cylinder 14 includes a rod 14a and a rear end opposite thereto, the rod 14a having a distal end connected to the rear end of the tubular member 12d, the rear end being connected rotatably to the second boom member 6b. The arm cylinder 14 is extended and retracted to thereby raise and lower the arm 12.

The tubular member 12d has a lower surface, from which a hook 17 is suspended. The hook 17, which is provided to hang the cutting device 20 in a stored state, is able to be engaged with an engagement portion 20a provided in a lower end of the cutting device 20.

As shown in FIG. 1, the suspension support member 13 is connected to a distal end of the tubular member 12a located at the most distal end and having the smallest diameter in the arm 12, extending downward in a direction substantially orthogonal to the tubular member 12a. The suspension support member 13 includes an upper end to be connected to the tubular member 12a and a lower end that forms a suspension connection portion 13a, from which the cutting device 20 is suspended through a direction change mechanism 16.

The cutting device 20 includes: a grasp unit 40 that is actuated in the opening and closing directions to grasp the cutting object T, a main unit 21 that supports the grasp unit 40, a drive mechanism 49 that actuates the grasp unit 40 in the opening and closing directions, a cutting unit 60 for cutting the cutting object T, a feed mechanism 65 that moves the cutting unit 60, a first detector 70a, a second detector 70b, and a controller. The grasp unit 40 includes a first grasper 50a and a second grasper 50b, and the drive mechanism 49 includes a first hydraulic cylinder 45a and a second hydraulic cylinder 45b that are connected to the first and second graspers 50a and 50b, respectively, to form a first drive mechanism 49a and a second hydraulic cylinder 49b, respectively. The first and second detectors 70a, 70b detect respective positions of the first and second graspers 50a, 50b, respectively.

Figure 2:
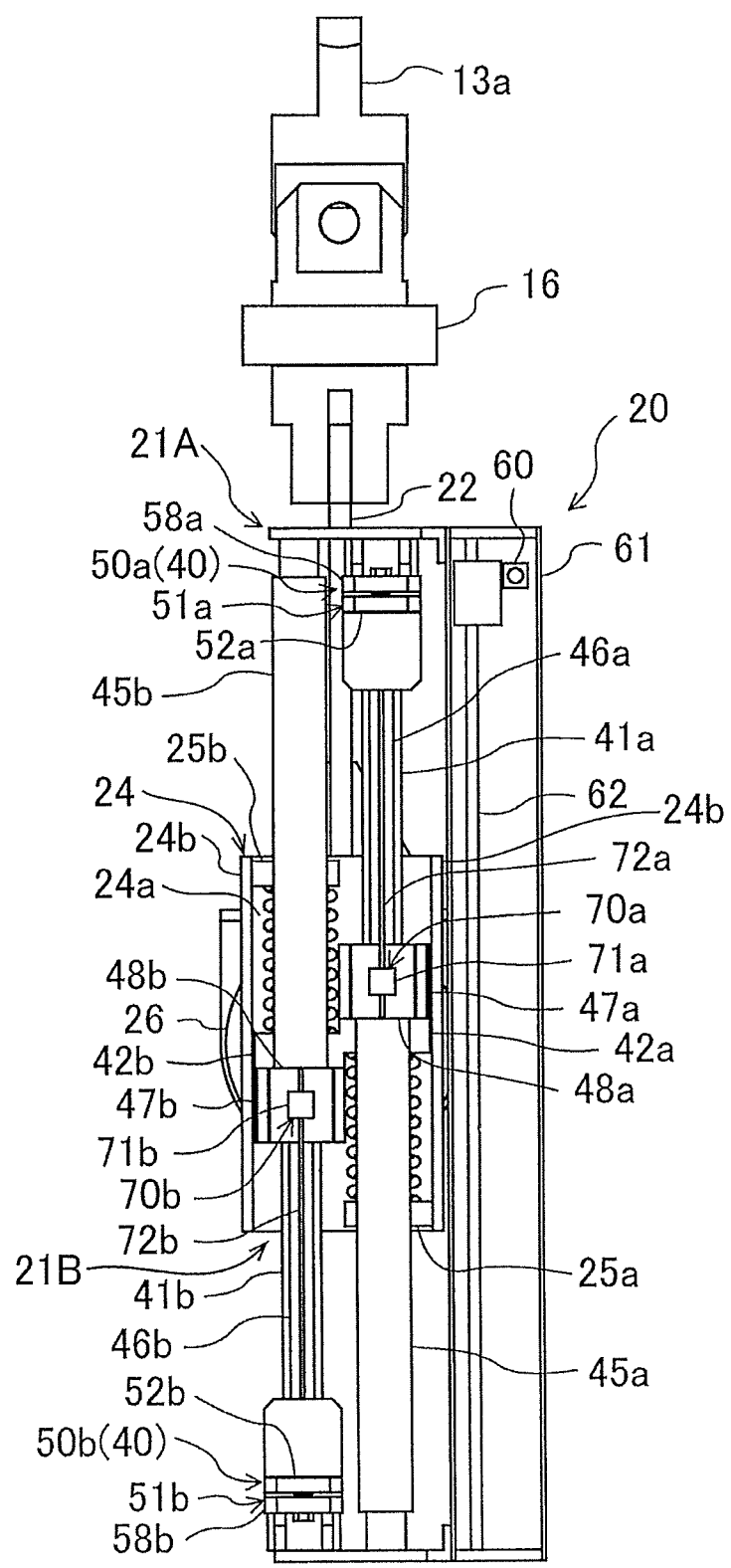
FIG. 2 is an elevational view of essential components of the cutting device according to the first embodiment.
Figure 3:
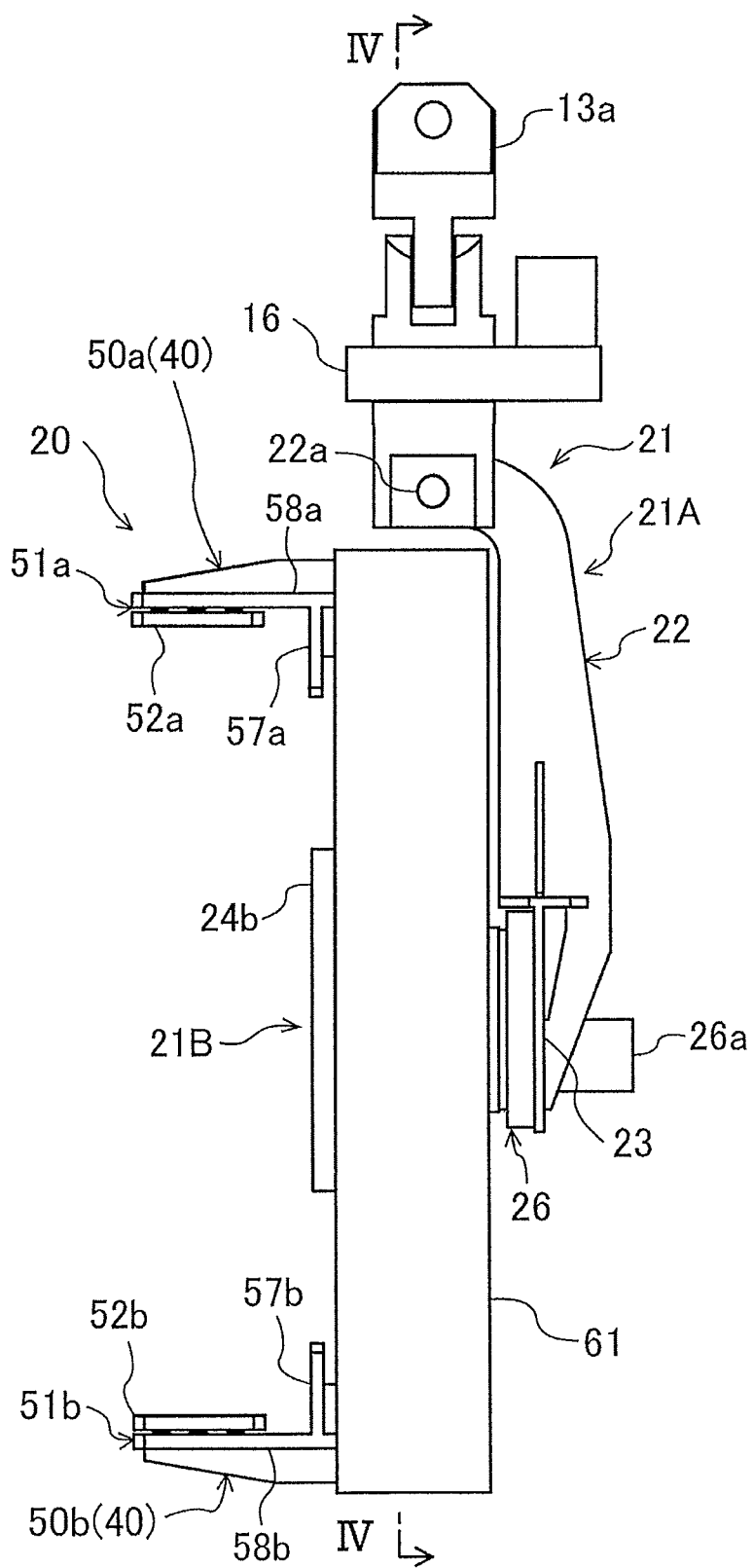
FIG. 3 is a side view of the essential components of the cutting device according to the first embodiment.
Figure 7:
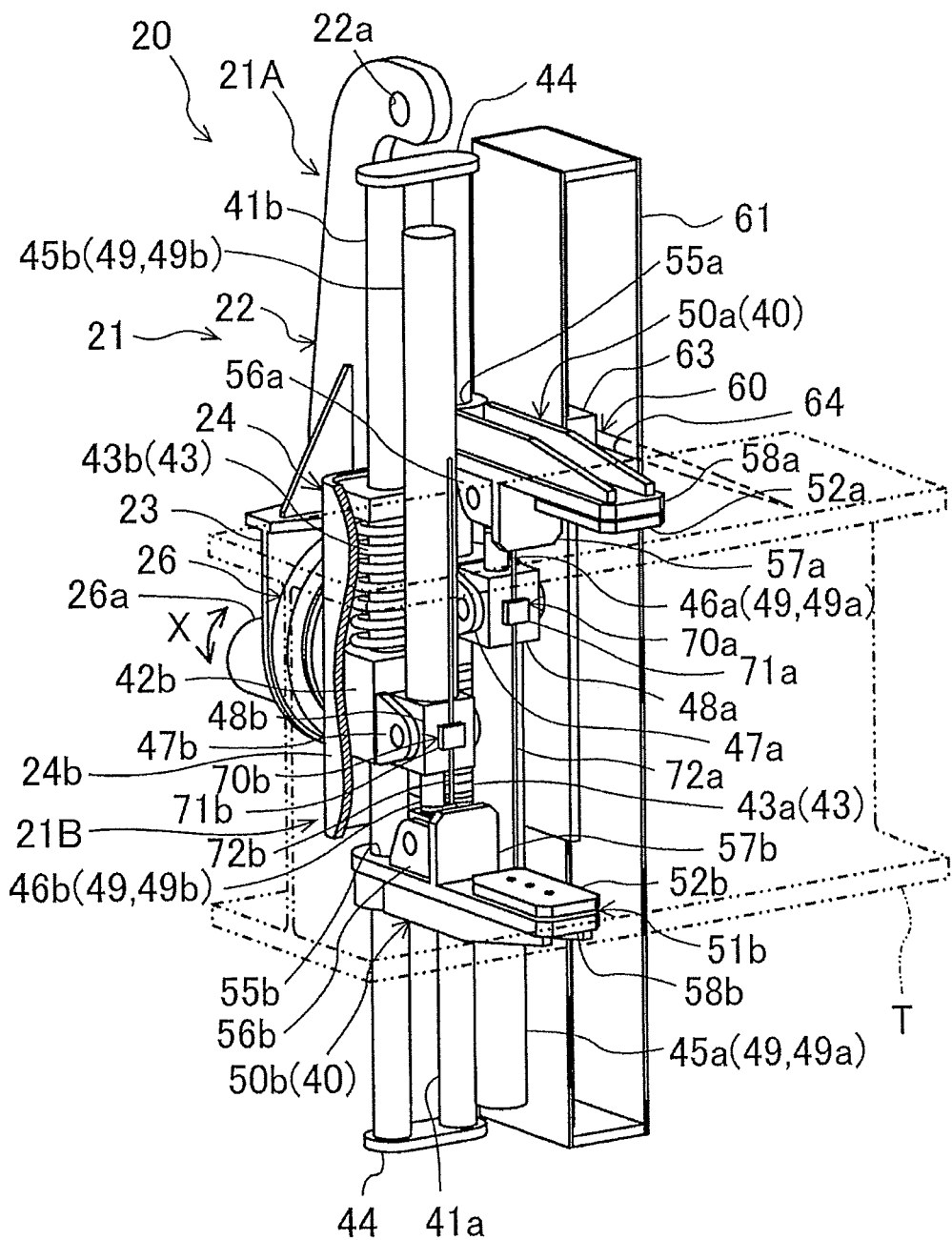
FIG. 7 is a perspective view for explaining a state of the cutting device according to the first embodiment when cutting a cutting object.

As shown in FIGS. 2, 3, and 7, the main unit 21 includes a first main section 21A, and a second main section 21B coupled to the first main section 21A through a turning mechanism 26. The first main section 21A includes a suspension plate 22 and a main plate 23, and the second main section 21B includes a support bracket 24, a pair of holding pieces 25a and 25b, a pair of guide shafts 41a and 41b, a pair of upper and lower support plates 44, and a position adjustment mechanism 43.

The suspension plate 22 is formed of a plate shaped to extend in the opening and closing directions (in the vertical direction in FIGS. 2, 3, and 7), including an upper end connected to the direction change mechanism 16 and a lower end opposite to the upper end. The main plate 23 is joined to a side surface of the lower end of the suspension plate 22 to extend in a left and right directions substantially orthogonal to the suspension plate 22. The support bracket 24 is connected to the main plate 23 through the turning mechanism 26 so as to be turnable about a predetermined turn axis. The turn axis extends in a turn-axis direction (in the front and rear direction in this embodiment) that is orthogonal to both the opening and closing directions and the left and right directions. The support bracket 24 includes a proximal wall 24a and left and right side walls 24b. The proximal wall 24a is coupled to the turning mechanism 26 so as to extend along a plane orthogonal to the turn axis. The left and right side walls 24b protrude from the left and right edges of the proximal wall 24a in a direction orthogonal thereto (frontward in this embodiment). In FIG. 7, the support bracket 24 is partially omitted for descriptive purpose.

As shown in FIGS. 1, 3, 5, and 7, the upper end of the suspension plate 22 has a shape curved to protrude frontward, provided with a suspension hole 22a. Through a pin or the like inserted into the suspension hole 22a and the direction change mechanism 16, the whole cutting device 20 including the suspension plate 22 is coupled to a lower part of the direction change mechanism 16. An upper part of the direction change mechanism 16 is connected to the suspension connection portion 13a rotatably about a horizontal axis relatively to the suspension support member 13.

The turning mechanism 26 is provided to turn the support bracket 24 and the other components constituting the second main section 21B about the turn axis relatively to the suspension plate 22 and the main plate 23 constituting the first main section 21A, including a turning motor 26a as shown in FIGS. 3 and 7. The turning motor 26a is mounted on a rear surface of the main plate 23, that is, a surface opposite to a front surface that faces the support bracket 24. The turning motor 26a includes an output shaft connected to the support bracket 24, and makes an action of turning the support bracket 24 about the turn axis within a predetermined angular range. The turn of the support bracket 24 enables a grasping direction in which the grasp unit 40 grasps the cutting object T to be changed, as described later.

Figure 5:
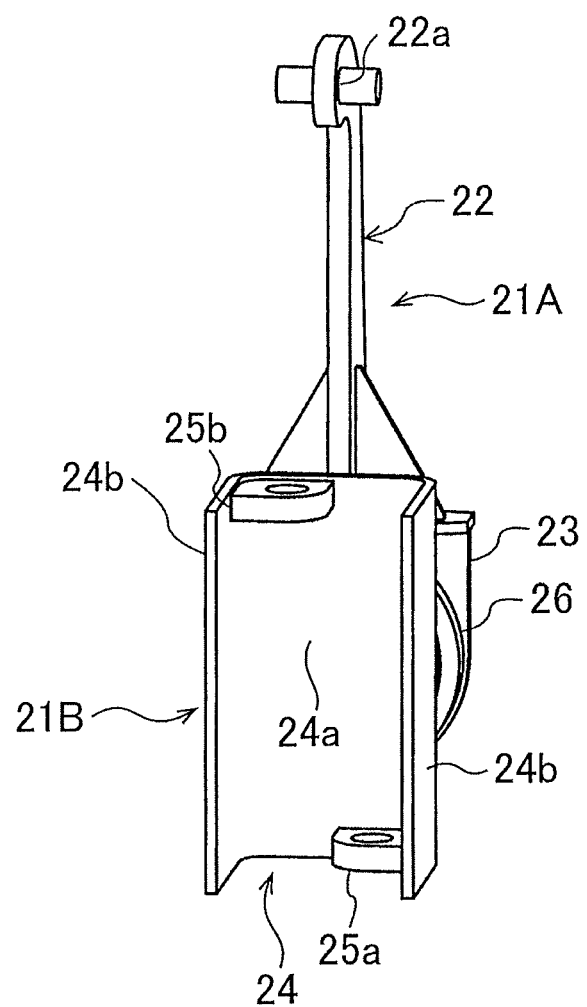
FIG. 5 is a perspective view of a part of the cutting device according to the first embodiment.

As shown in FIG. 5, the first and second guide pieces 25a and 25b are provided to longitudinally (verticaly in FIG. 5) opposite ends of the support bracket 24 at respective positions different from each other with respect to the left and right directions of the support bracket 24, being integrally secured to the support bracket 24, for example, by welding. The first and second guide pieces 25a and 25b arc formed with respective through-holes that allow the first and second guide shafts 41a and 41b to pass through the first and second guide pieces 25a and 25b, respectively.

Figure 4:
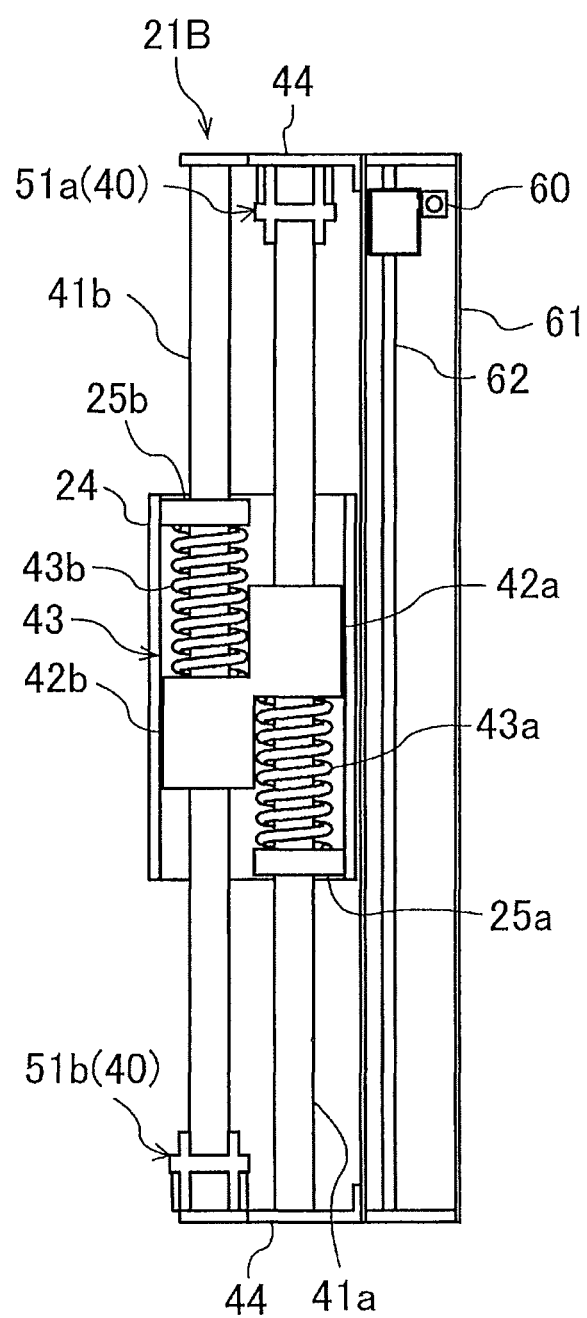
FIG. 4 is a sectional view taken along line IV-IV of FIG. 3.
Figure 6:
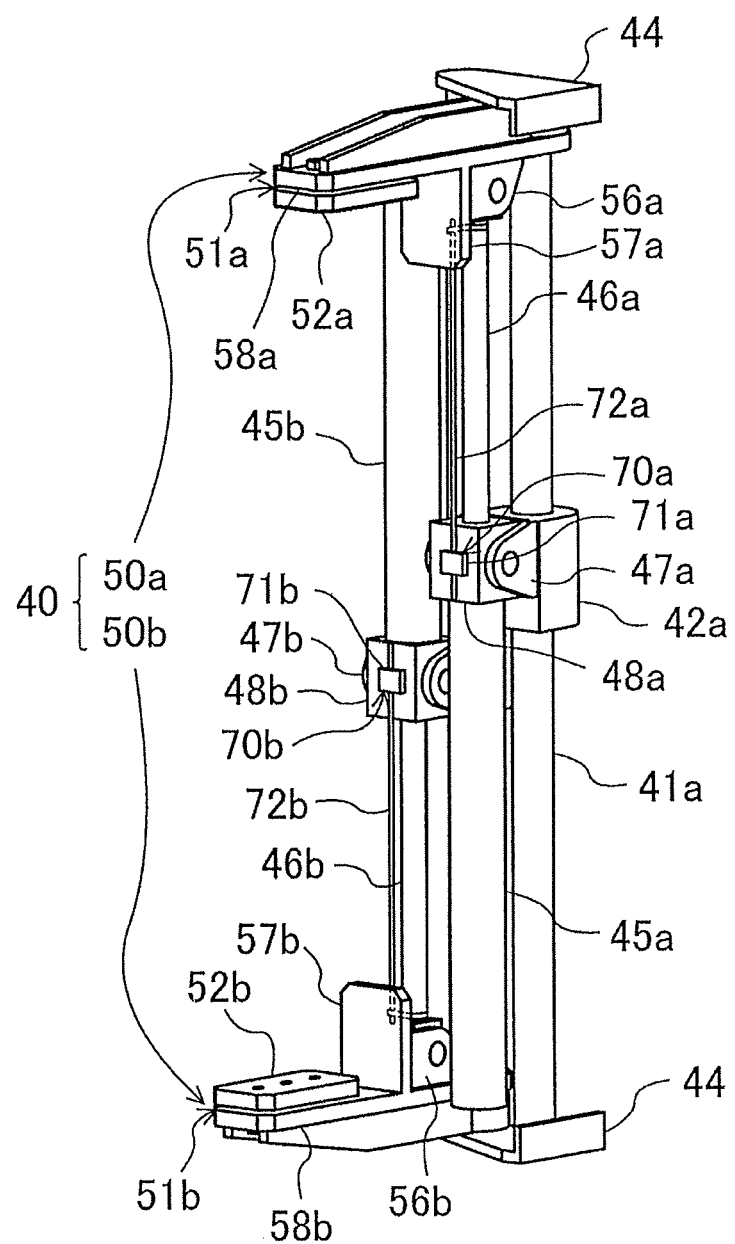
FIG. 6 is a perspective view of another part of the cutting device according to the first embodiment.

As shown in FIGS. 4 and 6, the first and second guide shafts 41a and 41b extend vertically inside the left and right side walls 24b of the support bracket 24. Specifically, the first and second guide shafts 41a and 41b are retained by the first and second guide pieces 25a and 25b so as to extend vertically beyond the upper and lower ends of the support bracket 24, in a state that the first guide shaft 41a passes through the through-hole of the first guide piece 25a and the second guide shaft 41b passes through the through-hole of the second guide piece 25b. The upper one of the paired mounting plates 44 interconnects respective upper ends of the first and second guide shafts 41a and 41b, and the lower one of the paired mounting plates 44 interconnects respective lower ends of the first and second guide shafts 41a and 41b.

The first grasper 50a of the grasp unit 40 includes a first base plate 58a serving as a base member, a first restriction wall 57a, and a first grasping contact member 52a. The second grasper 50a, 50b includes a second base plate 58b serving as a base member, a second restriction wall 57b, and a second grasping contact member 52b.

Each of the first and second base plates 58a and 58b has a front part and a rear part aligned in the front and rear direction. Respective front parts of the first and second base plates 58a, 58b forms a first grasp plate portion 51a and a second grasp plate portion 51b shown in FIGS. 6 and 7, respectively. The first and second grasp plate portions 51a and 51b are paralleled and opposed to each other in the opening and closing directionse so as to come into contact with the cutting object T to grasp the cutting object T.

The first and second restriction walls 57 protrude inward in the opening and closing directions from respective longitudinally middle parts of the first and second base plates 58a, 58b, respectively, each of the middle parts setting the boundary between the front part and the rear part in each of the first and second base plates 58a, 58b. The first and second restriction walls 57a and 57b can come into contact with the cutting object T when the first and second graspers 50a and 50b are moved by the operated hydraulic cylinders 45a and 45b to cause the grasp unit 40 to grasp the cutting object T thereby preventing the first and second graspers 50a and 50b from contact with the first and second hydraulic cylinders 45a and 45b.

Respective rear ends (on the back side of the drawing sheet of FIG. 7) of the first and second base plates 58a, 58b are formed with a first hole 55a and a second hole 55b, respectively. The first and second guide shafts 41a and 41b pass through the first hole 55a and the second hole 55b, whereby the first and second graspers 50a and 50b, which include the first and second base plates 58a and 58b, respectively, are supported on the second main section 21B slidably in the opening and closing directions along the first and second guide shafts 41a and 41b.

Figure 8:
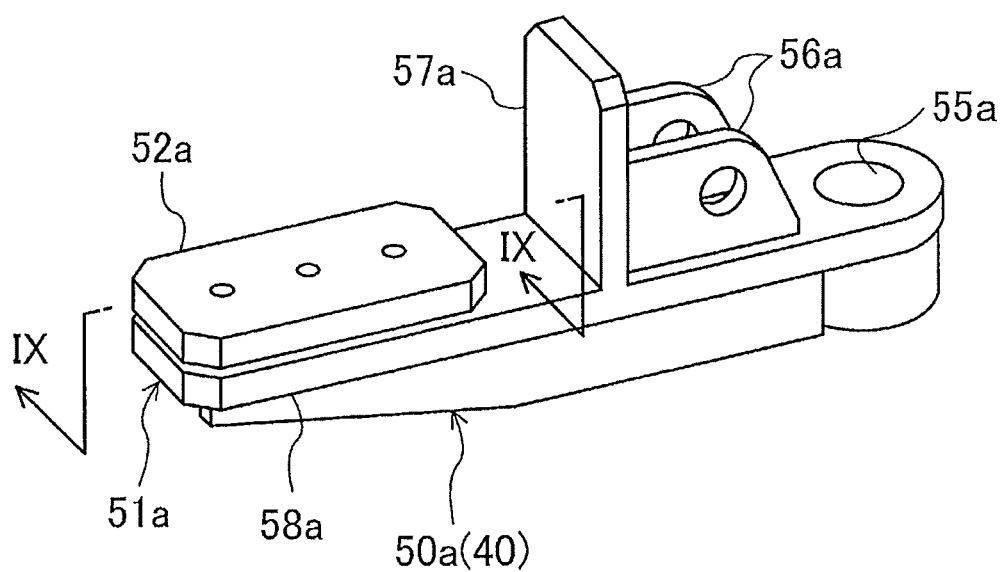
FIG. 8 is an enlarged perspective view of a grasp unit of the cutting device according to the first embodiment.
Figure 9:
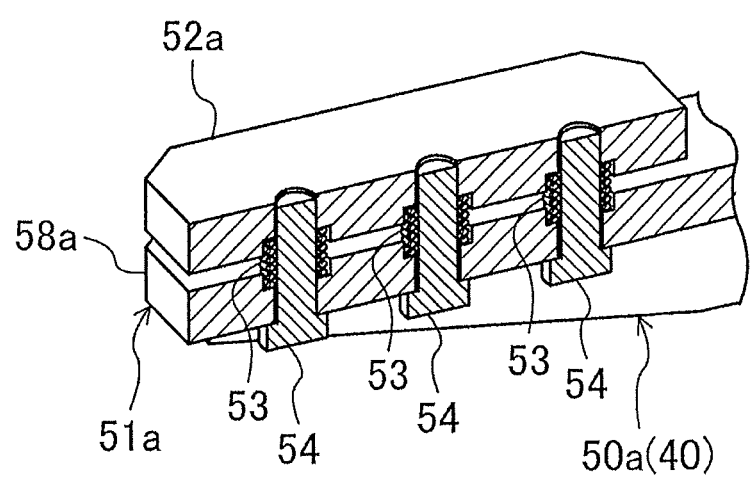
FIG. 9 is a sectional view taken along line IX-IX of FIG. 8.

As shown in FIGS. 8 and 9, in the first and second grasp plates 51a and 51b, the first and second grasping contact members 52a, 52b are disposed on respective inner sides, i.e., respective sides where the first and second grasping contact members 52a, 52b being capable of making direct contact with the cutting object T, of the front parts of the first and second base plates 58a, 58b with respect to the opening and closing directions. The first and second grasping contact members 52a and 52b are made of, for example, a heat-resistant resin. While FIGS. 8 and 9 show only the first grasper 50a for descriptive purpose, the second grasper 50b has the same configuration.

The first and second grasping contact members 52a, 52b are mounted on respective front parts of the first and second base plates 58a, 58b, respectively, through a plurality of pins 54 and a plurality of springs 53 each serving as a biasing member. In a state where the first and second grasping contact members 52a, 52b (FIG. 9 shows only the first grasping contact member 52a) are overlaid on respective front parts of the first and second base plates 58a, 58b (FIG. 9 shows only the first base plate 58a) in the plate thickness direction thereof, each of pins 54 penetrates either of the first and second grasping contact members 52a, 52b and either of the front parts in the plate thickness direction, thereby coupling respective front parts of the first and second base plates 58a, 58b and the first and second grasping contact member 52a, 52b, respectively, with allowing the first and second grasping contact members 52a, 52b to make relative movement in the plate thickness direction (opening and closing directions) to respective front parts of the first and second base plates 58a, 58b, respectively. The plurality of springs 53 are disposed around the plurality of pins 54, respectively, to be interposed between either of respective front parts of the first and second base plates 58a, 58b and either of the first and second grasping contact members 52a, 52b.

Respective front parts of the first and second base plates 58a, 58b and the first and second grasping contact members 52a, 52b mounted thereon as mentioned above form the first grasp plate portion 51a and the second grasp plate portion 51b, respectively, wherein the first and second grasping contact members 52a and 52b are biased by the resilient force of the springs 53, with respect to the first and second base plates 58a and 58b, in respective closing directions each being a direction in which the first and second grasping contact members 52a and 52b come close to each other in the opening and closing directions. The biasing force effectively restrains the first and second grasping contact members 52a and 52b constituting the first and second graspers 50a and 50b from being moved in respective opening directions in which they go away from each other, thereby enabling the first and second grasping contact members 50a and 50b to grasp the cutting object T more reliably and stably. Respective surfaces of the first and second grasping contact members 52a and 52b are provided with not-graphically-shown fine irregularities, which hinder the surfaces from slipping against the grasped cutting object T.

The second main section 21B further includes a pair of first projecting portions 56a and a pair of second projecting portions 56b. The first projecting portions 56a project from the rear end of the first base plate 58a to be interposed between the first restriction wall 57a and the rear end. The second projecting portions 56b project from the rear end of the second base plate 58b to be interposed between the second restriction wall 57b and the rear end.

The first and second hydraulic cylinders 45a and 45b constituting the drive mechanism 49 are hydraulic actuators that are extended and retracted by supply of hydraulic fluid to thereby move the first grasper 50a and the second grasper 50b, respectively, in the opening and closing directions, specifically, in opposite directions to move them to come close to each other and to go away from each other. The first hydraulic cylinder 45a includes a first rod 46a having a distal end, i.e. a longitudinally outer end, which is connected to the first projecting portions 56a. The second hydraulic cylinder 45b includes a second rod 46b having a distal end, i.e. a longitudinally outer end, which is connected to the second projecting portions 56b. In the present embodiment, the first hydraulic cylinder 45a constituting the first drive mechanism 49a for moving the first grasper 50a and the second hydraulic cylinder 45b constituting the second drive mechanism 49b for moving the second grasper 50b are able to move the first and second graspers 50a and 50b individually, which allows the cutting object T to be grasped efficiently and reliably. Alternatively, it is also possible to move both the first and second graspers 50a and 50b through a single drive mechanism.

As shown in FIG. 7, through the extension and retraction of the first rod 46a of the first hydraulic cylinder 45a, the first grasper 50a is moved in the opening and closing directions (vertically) along the first guide shaft 41a while being guided by the first guide shaft 41a. Similarly, through the extension and retraction of the second rod 46b of the second hydraulic cylinder 45b, the second grasper 50b is moved in the opening and closing directions along the second guide shaft 41b while being guided by the second guide shaft 41b.

When the first and second rods 46a and 46b of the first and second hydraulic cylinders 45a and 45b extend to move the first and second graspers 50a and 50b greatly in the respective opening directions, respectively, the mounting plate 44 abuts against the first and second graspers 50a and 50b thereby hindering further movement of the first and second graspers 50a and 50b.

The position adjustment mechanism 43 is to adjust the midway position between the first and the second graspers 50a and 50b relative to the second main section 21B, namely, the exact middle position between the first and the second graspers 50a and 50b in the grasping direction, so as to allow the first and second graspers 50a and 50b to grasp the cutting object T regardless of the relative position of the main unit 21 to the cutting object T, the position adjustment mechanism 43 including a first block 42a holding the first hydraulic cylinder 45a, a second block 42b holding the second hydraulic cylinder 45b, a first spring 43a biasing the first block 42a upward, and a second spring 43b biasing the second block 42b downward.

The first and second blocks 42a, 42b are mounted on respective middle parts of the first guide shafts 41a, 41b so as to be slidable in respective longitudinal directions of the first and second guide shafts 41a, 41b (in directions parallel to the opening and closing directions; vertically in this embodiment), respectively. The first block 42a and the second block 42b are integrally coupled to each other at their respective positions different from each other with respect to the axial direction of the first and second guide shafts 41a and 41b. The first spring 43a is disposed around the first guide shaft 41a to be interposed between the first guide piece 25a and the first block 42a, thereby biasing the first block 42a upward, i.e. in the opening direction of the first grasper 50a. The second spring 43b is disposed around the second guide shaft 41a to be interposed between the second guide piece 25b and the second block 42b, thereby biasing the second block 42b downward, i.e. in the opening direction of the second grasper 50b.

The first and second hydraulic cylinders 45a, 45b are disposed frontward of the first and second guide shafts 41a, 41b in parallel thereto, respectively, being secured to the first and second blocks 42a, 42b, respectively. Specifically, a pair of first brackets 47a protrude from the first block 42a toward the first hydraulic cylinder 45a, i.e. frontward, and a pair of second brackets 47b protrude from the second block 42b toward the second hydraulic cylinder 45b, i.e. frontward. On the other hand, the first hydraulic cylinder 45a has an upper end, which is provided with a first connecting portion 48a, and the second hydraulic cylinder 45b has a lower end, which is provided with a second connecting portion 48b. The first connecting portion 48a is interposed between the paired first brackets 47a, and a pin or the like penetrates them to thereby connect the upper end of the first hydraulic cylinder 45a to the first block 42a rotatably about an axis extending in the left and right directions. The second connecting portion 48b is interposed between the paired second brackets 47b, and a pin or the like penetrates them to thereby connect the upper end of the second hydraulic cylinder 45b to the second block 42b rotatably about an axis extending in the left and right directions.

As shown in FIGS. 2, 6 and 7, the first and second detectors 70a and 70b detect information on respective positions of the first and second graspers 50a and 50b, respectively, when they are grasping the cutting object T.

The first detector 70a includes a first detector body 71a and a first stroke guide 72a, and the second detector 70b includes a second detector body 71b and a second stroke guide 72b. The first detector body 71a is mounted on the first connecting portion 48a of the first hydraulic cylinder 45a, that is, the portion close to that where the first rod 46a is protruded from and retracted into the cylinder body of the first hydraulic cylinder 45a. The first stroke guide 72a is shaped like a long shaft penetrating the first detector body 71a, being secured to the distal end, i.e., the longitudinally outer end, of the first rod 46a so as to be moved integrally with the first rod 46a longitudinally thereof. The first detector body 71a detects a first passing amount by which the first stroke guide 72a has passed through the first detector body 71a and outputs a detection signal corresponding to the first passing amount. Similarly, the second detector body 71b is mounted on the second connecting portion 48b of the second hydraulic cylinder 45b, that is, the portion close to that where the second rod 46b is protruded from and retracted into the cylinder body of the second hydraulic cylinder 45b. The second stroke guide 72b is shaped like a long shaft penetrating the second detector body 71b, being secured to the distal end, i.e., the longitudinally outer end, of the second rod 46b so as to be moved integrally with the second rod 46b longitudinally thereof. The second detector body 71b detects a second passing amount by which the second stroke guide 72b has passed through the second detector body 71b and outputs a detection signal corresponding to the second passing amount.

The first and second detectors 70a and 70b are included in a position setting means for setting a cutting start position and a cutting end position that are described later. The first and second detectors 70a and 70b detect the respective positions of the first and second graspers 50a and 50b when they are brought into a state of grasping the cutting object T, by being moved by the first and second hydraulic cylinders 45a and 45b, from their respective full-opening positions where they are spaced at the greatest interval, i.e. where the first and second graspers 50a and 50b abut against the upper and lower mounting plates 44, respectively. Specifically, the first and second rods 46a, 46b are retracted into respective cylinder bodies of the first and second hydraulic cylinders 45a, 45b by respective amounts corresponding to respective movement amounts of the first and second graspers 50a, 50b, while the first and second stroke guides 72a, 72b secured to the first and second rods 46a, 46b, respectively, pass through the first and second detector bodies 71a, 71b, respectively, by respective amounts corresponding to the above-mentioned movement amounts. Therefore, respective passing amounts of the first and second stroke guide 72a, 72b, namely, the first and second passing amounts, detected by the first and second detector bodies 71a, 71b, respectively, correspond to the amounts by which the first and second rods 46a, 46b are protruded from or retracted into respective cylinder bodies of the first and second hydraulic cylinders 45a, 45b and further corresponds to respective movement amounts of the first and second graspers 50a, 50b. This enables the respective positions of the first and second graspers 50a and 50b and the dimension of the cutting object T in the opening and closing directions to be calculated based on the first and second passing amounts.

Thus, the first and second detectors 70a and 70b according to the present embodiment detect the respective positions of the first and second graspers 50a and 50b grasping the cutting object T not directly but indirectly based on the respective amounts by which the first and second rods 46a and 46b are retracted into respective cylinder bodies of the first and second hydraulic cylinders 45a and 45b. The detector according to the present invention may alternatively be configured to detect the respective moving strokes of the first and second graspers 50a and 50b directly.

Figure 10:
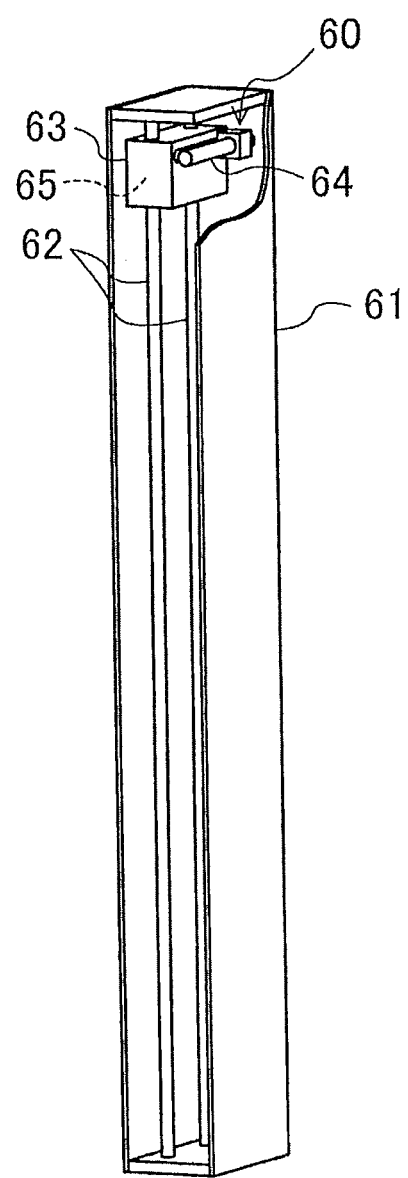
FIG. 10 is a perspective view of a cutting unit of the cutting device according to the first embodiment.

As shown in FIGS. 2, 4, and 10, the cutting unit 60 is disposed side by side with the grasp unit 40 to cut the cutting object T. Specifically, the grasp unit 40 and the cutting unit 60 are disposed adjacent to each other in the left and right directions orthogonal to the opening and closing directions. The present embodiment employs as the cutting unit 60 a torch operable to emit a flame, for example, by use of gas to perform fusion cutting of the cutting object T.

The second main section 21B further includes a box 61, a plurality of (two in this embodiment) guide rails 62, and a torch holding section 63, the box 16 provided for supporting the cutting unit 60 movably in a cutting direction parallel to the opening and closing directions, which is vertical in this embodiment. The box 61 has a vertically elongated rectangular parallelepiped shape with one face thereof which faces the cutting object T (front face) being opened, accommodating the cutting unit 60 while allowing the cutting unit 60 to slide vertically in the box 61. The box 61 includes longitudinally opposite ends, that is, upper and lower opposite ends, which are connected to the paired mounting plates 44, respectively. In FIG. 10, the box 61 is partially omitted to show the configuration of the cutting unit 60 and other components. The plurality of guide rails 62 are housed in the box 61 while extending in the longitudinal direction of the box 61 (in the direction parallel to the opening and closing directions of the grasp unit 40) to guide the cutting unit 60 in the longitudinal direction.

The torch holding section 63 holds the cutting unit 60, while being mounted on the plurality of guide rails 62 so that the guide rails 62 pass through the torch holding section 63 vertically, thereby being supported on the guide rails 62 movably along the guide rails 62 in the direction parallel to the opening and closing directions of the grasp unit 40 (in the vertical direction in this embodiment).

The cutting unit 60 includes a torch section 64. The torch section 60 includes a flame outlet through which a flame is emitted, and is held on the torch holding section 63 so as to be movable integrally with the torch holding section 63 in the cutting direction with the flame outlet facing frontward, which is a direction orthogonal to the opening and closing directions of the grasp unit 40.

The feed mechanism 65 operates to move the torch holding section 63 and the cutting unit 60 held thereon in the longitudinal direction of the guide rails 62, i.e. in the cutting direction. The feed mechanism 65 is, for example, a ball screw mechanism. The ball screw mechanism includes ball screws constituting the guide rails 62, respective nuts screwed to the ball screws, and a motor disposed in the torch holding section 63 to rotate the nuts.

The controller is included in the position setting means together with the first and second detectors 70a and 70b. The controller sets the cutting start position and the cutting end position, based on the positions of the first and second graspers 50a and 50b detected by the first and second detectors 70a and 70b, and controls the operation of the cutting unit 60 based on the set cutting start position and cutting end position. Specifically, upon the start of cutting the cutting object T, the controller controls the feed mechanism 65 so as to position the cutting unit 60 (the torch holding section 63 in this embodiment) at the cutting start position which corresponds to the position of the first grasper 50a when the first and second graspers 50a and 50b are grasping the cutting object T, and controls the cutting unit 60 so as to cause the torch section 64 to emit a flame at the cutting start position. Besides, the controller controls the feed mechanism 65 to stop the movement of the cutting unit 60 when cutting unit 60 (the torch holding section 63 in this embodiment) reaches the cutting end position which corresponds to the position of the second grasper 50b, and controls the cutting unit 60 so as to cause the torch section 64 to stop the flame emission at the cutting end position.

Now will be described a method for cutting a cutting object T by using the above-described cutting device 20.

(0) Preparation Step

In advance of the above-mentioned cutting operation, the crushing device 7 of the demolition machine 1 is operated to make a rearward rotational movement to retreat to a position for not interfering the cutting performance of the cutting device 20. There can be a case of no requirement for the rearward rotational movement of the crushing device 7 depending on a certain work site or a certain structure of the cutting object T.

Besides, the cutting device 20 is shifted from the not-graphically-shown stored state to a state of being suspended from the boom 6 as shown in FIG. 1.

(1) First Step (Grasp Unit Positioning Step)

In the first step, performed is approaching the cutting device 20 to the cutting object T indicated by the two-dot chain line in FIG. 7, through an operation provided by an operator in the cab 4. The cutting device 20 is brought to a position where the front face thereof is opposed to the cutting object T. The cutting device 20 is thereafter operated to reach a position where the cutting object T is located between the first and second graspers 50a and 50b.

(2) Second Step (Grasping Step)

After confirmation of the position of the cutting device 20 relatvive to the cutting object T, performed is the second step of actuating the first and second graspers 50a and 50b through the first and second drive mechanisms 49a and 49b. Specifically, the first and second hydraulic cylinders 45a and 45b are operated so that the first and second rods 46a and 46b are retracted into the cylindrical bodies of the first and second hydraulic cylinders 45a and 45b, respectively, i.e. operated in the respective retracting directions, thereby moving the first and second graspers 50a and 50b in their respective closing directions. This movement brings the first and second graspers 50a and 50b into contact with the cutting object T to grasp it. The controls for moving the first and second graspers 50a and 50b including the movement, may be performed by the above-described controller.

The first and second graspers 50a and 50b rarely come into contact with the cutting object T exactly at the same time through the above movement; usually, one of the first and second graspers 50a and 50b comes into contact with the cutting object T earlier than the other. Even in this case, the position adjustment mechanism 43 can absorb the load to be applied to the cutting device 20. For example, when the first grasper 50a comes into contact with the cutting object T earlier than the second grasper 50b, a force will continue acting on the first grasper 50a to move it further in the closing direction; however, this force causes the first block 42a holding the first hydraulic cylinder 45a for driving the first grasper 50a to press the first spring 43a to and contract it while the second spring 43b is extended. The respective resilient restoring forces of the first and second springs 43a and 43b at this time act on the first grasper 50a so as to push back it in the opening direction, which allows the relative position of the grasp unit 40 to the cutting object T to be adjusted so as to locate the first and second graspers 50a and 50b at respective positions having the same distance from the longitudinally central position of the support bracket 24. Through the action of thus equalizing the resilient restoring forces of the first and second springs 43a and 43b of the position adjustment mechanism 43 are equalized, the midway position between the first and second graspers 50a and 50b and respective positions of the first and second hydraulic cylinders 45a and 45b of the drive mechanism 49 are adjusted so as to enable the first and second graspers 50a and 50b to grasp the cutting object T regardless of the relative position of the main unit 21 to the cutting object T. This suppresses the load to be applied to the grasper that is one of the first and second graspers 50a and 50b and having come into contact with the cutting object T earlier than the other, protecting the grasp unit and the cutting device 20 from their breakages due to the load.

(3) Third Step (Position Fixing Step)

In the third step, the first and second detectors 70a and 70b detect the positional information of the first and second graspers 50a and 50b when the first and second graspers 50a and 50b have grasped the target objet T and, based on the detected positional information, the cutting start position and end position are set. In this embodiment, the controller sets respective positions of the first and second graspers 50a and 50b that are grasping the cutting object T as the cutting start position and the cutting end position respectively, based on respective detection signals input from the first and second detectors 50a and 50b. Thus, in this embodiment, the first and second detectors 70a and 70b and the controller are included in the position setting means that sets the cutting start position and end position to respective positions of the first and second graspers 50a and 50b that are grasping the cutting object T.

Meanwhile, the first and second springs 43a and 43b of the position adjustment mechanism 43 exert biasing forces to the first and second blocks 42a and 42b so as to retain the first and second blocks 42a and 42b at the longitudinally central position of the support bracket 24, thereby allowing not only respective positions of the first and second hydraulic cylinders 45a, 45b connected to the first and second blocks 42a, 42b, respectively, but also respective positions of the first and second detector body 71a, 71b of the first and second detectors 70a, 70b mounted on the first second connecting portion 48a, 48b of the first and second hydraulic cylinder 45a, 45b to be adjusted. Thus, respective positions of the first and second hydraulic cylinders 45a and 45b are adjusted to equalize respective protruding or retracting amounts of the first and second rods 46a and 46b from or into their respective cylinder bodies. This enables the first and second detectors 70a and 70b to accurately detect the protruding or retracting amounts of the first and second rods 46a and 46b, that is, to accurately detect the positional information of the first and second graspers 50a and 50b grasping the cutting object T.

(4) Fourth Step (Cutting Unit Positioning Step)

In the fourth step, the torch holding section 63 of the cutting unit 60 is moved by the feed mechanism 65 in the opening and closing directions of the grasp unit 40 and positioned at the cutting start position, based on the positional information of the first grasper 50a obtained in the third step. In this embodiment, the controller controls the feed mechanism 65 to position the cutting unit 60 (the torch holding section 63 in this embodiment) at the cutting start position having been set based on the positional information of the first grasper 50a.

(5) Fifth Step (Cutting Step)

In the fifth step, by the controller, the cutting unit 60 is controlled to operate the torch section 64 constituting the cutting unit 60 and the feed mechanism 65 is controlled to move the torch section 64 from the cutting start position to the cutting end position. This allows the cutting unit 60 to cut the cutting object T. Specifically, the operation of the cutting unit 60 is started at the cutting start position to cause the torch section 64 to emit a flame from the flame outlet while sliding toward the cutting end position in the cutting direction along the opening and closing directions of the grasp unit 40, thereby performing fusion cutting of the cutting object T. Subsequently, the controller controls the cutting unit 60 and the feed mechanism 65 to stop the movement and the flame emission of the torch section 64 when the cutting unit 60 has reached the cutting end position. The fusion cutting of the cutting object T is thereby ended.

The cutting start position of the cutting unit 60 does not necessarily have to agree with the position of the first grasper 50a; for example, in order to start the cutting operation smoothly, the cutting start position may be set to a position slightly before the position of the first grasper 50a and the operation of the cutting unit 60 is started at the set cutting start position. In other words, the cutting unit 60 including the torch section 64 according to the first embodiment may be conveyed in the cutting direction along the opening and closing directions while the torch section 64 has already started to emit a flame. Similarly, in order to complete the cutting operation reliably, the cutting end position may be set to a position slightly ahead of the position of the second grasper 50b to continue the operation of the cutting unit 60 until it reaches the set cutting end position. In other words, the torch section 64 may continue emitting a flame even after the completion of the cutting operation.

In the above-described cutting step, the position adjustment mechanism 43 can also contribute to the grasping stability and the prevention of breakage of the cutting device 20. For example, even when the grasp unit 40 is vibrated by the own load of the cutting object T acting on the cutting device 20 during the thermal cutting of the cutting object T or rebound or vibration due to the residual strain after the thermal cutting of the cutting object T, the first and second springs 43a and 43b of the position adjustment mechanism 43 is able to absorb the vibration. This makes it possible to improve the grasping stability and to prevent breakage of the cutting device 20. The first spring 43a and the second spring 43b constituting the position adjustment mechanism 43, thus, is capable of not only exerting respective biasing forces to the first and second blocks 42a and 42b to keep them at the longitudinally central position of the support bracket 24 but also absorbing vibration and the like of the grasp unit 40 to thereby minimize the influence of the vibration and the like on the cutting device 20.

(6) Sixth Step (Finishing Step)

After the completion of the thermal cutting of the cutting object T, the first and second drive mechanisms 49a and 49b move the first and second graspers 50a and 50b in the respective opening directions to release the grasping of the cutting object T. The movements of the first and second graspers 50a and 50b also can be controlled by the controller.

The cutting device 20 is thereafter moved away from the cutting object T and the next operation is started. If there is a need for further fusion cutting at another position in the cutting object T at this stage, the cutting device 20 is brought to the position to perform additional fusion cutting of the cutting object T through steps similar to the above.

In the first step (grasp unit positioning step), the turning mechanism 26 can turn the second main section 21B relatively to the first main section 21A in either of the directions shown by the arrows X in FIG. 7 about the turn axis extending in the front and rear direction in accordance with the shape of the cutting object T to thereby enable the grasp unit 40 to grasp the cutting object T and enable the cutting unit 60 to cut the cutting object T regardless of the shape of the cutting object T. Specifically, the turning motor 26a attached to the turning mechanism 26 can operate to turn the support bracket 24 to turn the first and second graspers 50a and 50b integrally with the cutting unit 60. For example, in the case where the cutting object T is a columnar steel frame column extending vertically, it allows the cutting operation to be efficiently performed that the turning mechanism 26 turns the grasp unit 40 and the cutting unit 90 degrees to bring the grasp unit 40 into a position to allow the grasp unit 40 to grasp the columnar steel frame laterally and that the feed mechanism 65 moves the cutting unit 60 in the cutting direction extending in the left and right directions that is the opening and closing directions of the grasp unit 40.

Thus, in this embodiment, the cutting start position and the cutting end position are set to respective positions of the first grasper 50a and the second grasper 50b that are grasping the cutting object T, respectively, and the cutting unit 60 cuts the cutting object T with the movement thereof from the cutting start position to the cutting end position in the cutting direction along the opening and closing directions of the grasp unit 40. In other words, the position of the cutting unit 60 is determined based on the positional information of the pair of first and second graspers 50a and 50b that are grasping the cutting object T and the cutting unit 60 cuts the cutting object T with the movement thereof in the cutting direction along the opening and closing directions of the graspers 50a and 50b. This makes it possible to perform a cutting work efficiently with no need for a complex structure. Besides, the simple structure allows the operation to be made easily and has excellent durability against shock and vibrations, which is suitable for use in a work site where strong vibrations and shocks are likely to occur.

Figure 11:
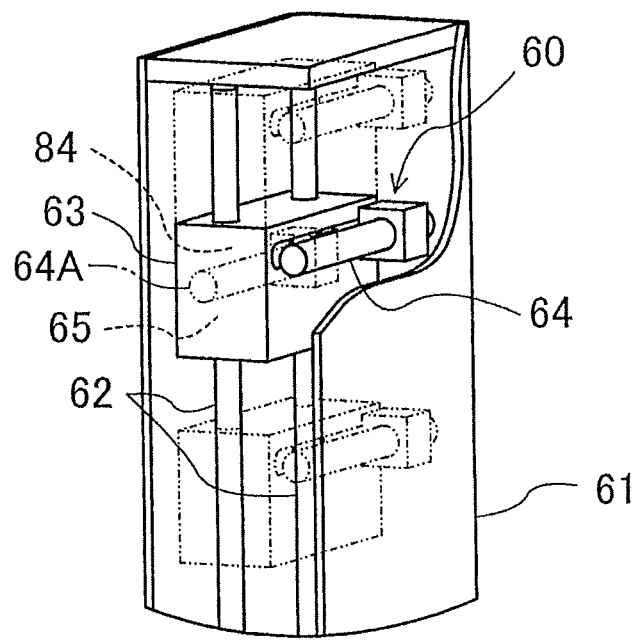
FIG. 11 is an enlarged perspective view of part of a cutting unit of a cutting device according to a second embodiment of the present invention.

Next will be described a second embodiment of the present invention with reference to FIG. 11. The following description of a cutting device according to the second embodiment only deals with differences from the cutting device 20 according to the first embodiment.

The cutting device according to the second embodiment includes a displacement mechanism 84 in addition to the constituent elements of the cutting device 20 according to the first embodiment. The displacement mechanism 84, as shown by the two-dot chain line 64A in FIG. 11, displaces the flame outlet of the torch section 64 linearly in the front and rear direction orthogonal to the cutting direction (i.e. the direction in which the torch section 64 slides along the lengths of the guide rails 62), that is, in the direction in which the torch section 64 emits a flame through the flame outlet. This displacement enables the position of the flame outlet relative to a target objet T to be adjusted. The displacement mechanism 84 preferably includes, for example, a gear mechanism having a rack and a pinion and a motor that actuates the gear mechanism. The displacement mechanism 84, alternatively, may be a cylinder device configured to extend and retract in a direction to displace the flame outlet of the torch section 64.

The cutting method according to the second embodiment differs from the method according to the first embodiment in that the above-described fourth step, namely, the cutting unit positioning step, further includes displacing the flame outlet of the torch section 64 linearly in the front and rear direction to thereby adjust the distance between the flame outlet of the torch section 64 and the cutting object T.

The displacement of the torch section 64 enables efficient cutting of the cutting object T to be performed. For example, in the case of fusion cutting of a cutting object T that is an H-section steel member so as to cut a flange thereof and thereafter cut a web, it allows the fusion cutting of the H-section steel member to be performed efficiently to displace frontward the cutting unit 60 that had been positioned with reference to the flange through the displacement mechanism 84 to bring the cutting unit 60 close to the web and to perform the fusion cutting in a situation where the flame outlet is as close to the web as possible.

Moreover, the displacement mechanism 84 is able to displace the cutting unit 60 closer to or farther away from the cutting object T even during the cutting operation, which allows also a fusion cutting of also a cutting object T having an irregular surface on the side facing the cutting unit 60 to be efficiently performed.

Next will be described a third embodiment of the present invention with reference to FIG. 12. The following description of a cutting device according to the third embodiment only deals with differences from the cutting device according to the first embodiment.

The cutting device according to the third embodiment includes a tilting mechanism 85 in addition to the constituent elements of the cutting device 20 according to the first embodiment. The tilting mechanism 85, as shown by the two-dot chain lines 64B and 64C in FIG. 12, has a function of tilting the cutting unit 60 so as to bring the distal end of the cutting unit 60 away from a reference axis extending in the front and rear direction orthogonal to the cutting direction in which the feed mechanism 65 moves the cutting unit 60, that is, a function of tilting the flame outlet of the torch section 64. Specifically, the torch section 64 is mounted on the torch holding section 63 rotatably about an axis extending in the left and right directions, and the tilting mechanism 85 includes an actuator, for example, mounted on the torch holding section 63, to rotate the torch section 64 to thereby tilt the flame outlet in the moving direction of the cutting unit 60. Thus, the torch section 64 is supported on the torch holding section 63 pivotally to be able to be tilted upward and downward so as to bring the distal end thereof away from the reference axis. The tilting mechanism 85 preferably includes, for example, a motor or a cylindrical device.

The cutting method according to the third embodiment differs from the method according to the first embodiment in that the above-described fourth step, namely, the cutting unit positioning step, further includes tilting the distal end (flame outlet) of the torch section 64 in such a way as to swing it vertically.

The tilting of the torch section 64 also makes it possible to cut a cutting object T more efficiently. For example, in the case of fusion cutting of the cutting object T, which is an H-section steel member, wherein the joint between an upper flange and a web of the H-section steel member is cut, tilting the torch section 64 upward so as to orient the distal end of the torch section 64 to the joint enables the joint between the flange and the web of the H-steel member to be cut efficiently.

Figure 12:
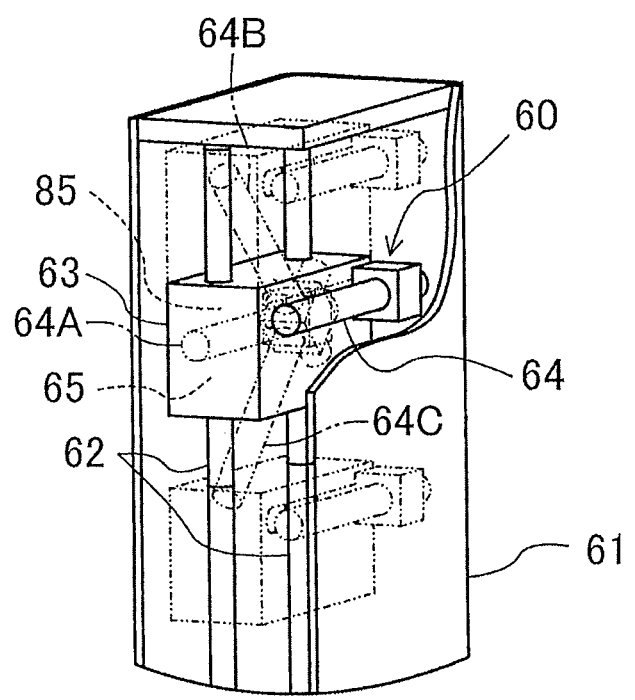
FIG. 12 is an enlarged perspective view of part of a cutting unit of a cutting device according to a third embodiment of the present invention.

The titling mechanism 85 shown in FIG. 12 may be added to the cutting device instead of or together with the above-described displacement mechanism 84. The latter case allows the torch section 64 to make both of linear displacement as shown by the two-dot chain line 64A and a tilt as shown by the two-dot chain lines 64B and 64C in FIG. 12.

Figure 13:
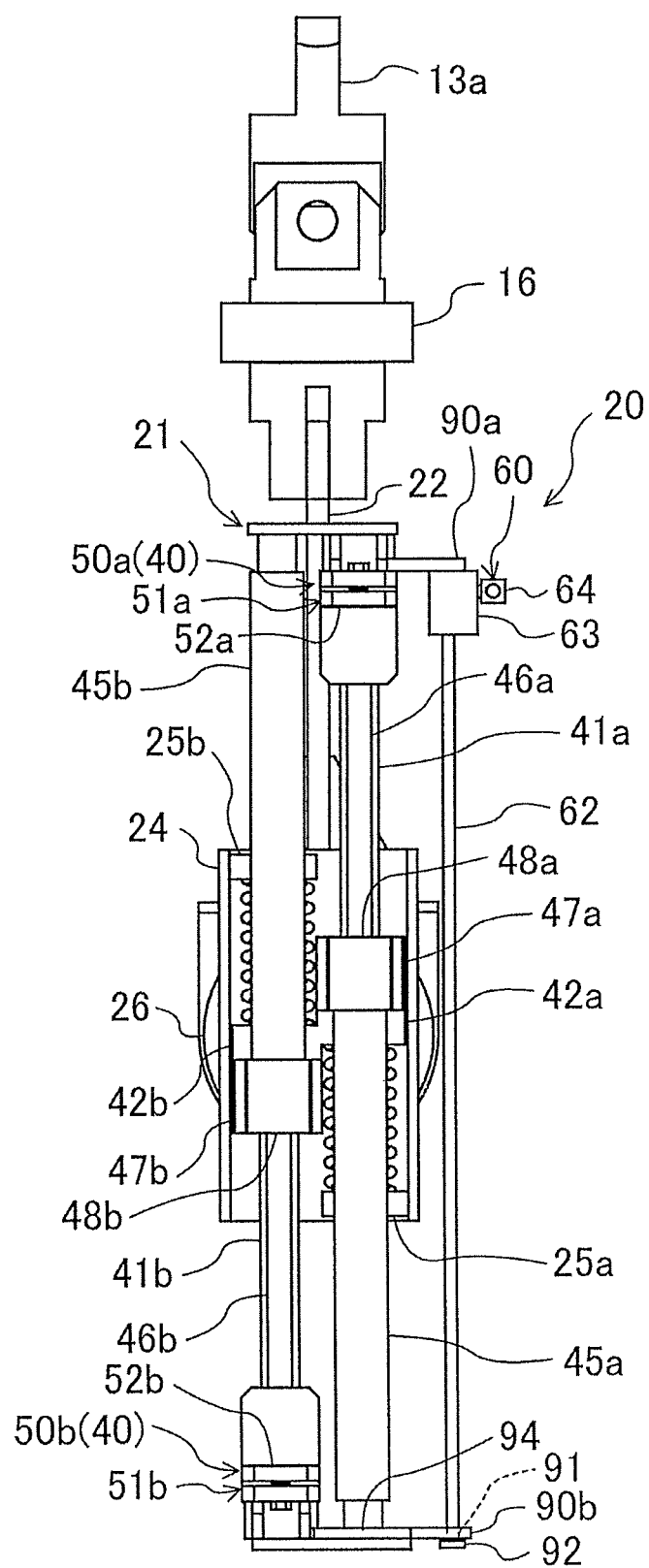
FIG. 13 is an elevational view of a grasp unit and a cutting unit of a cutting device according to a fourth embodiment of the present invention.
Figure 14:
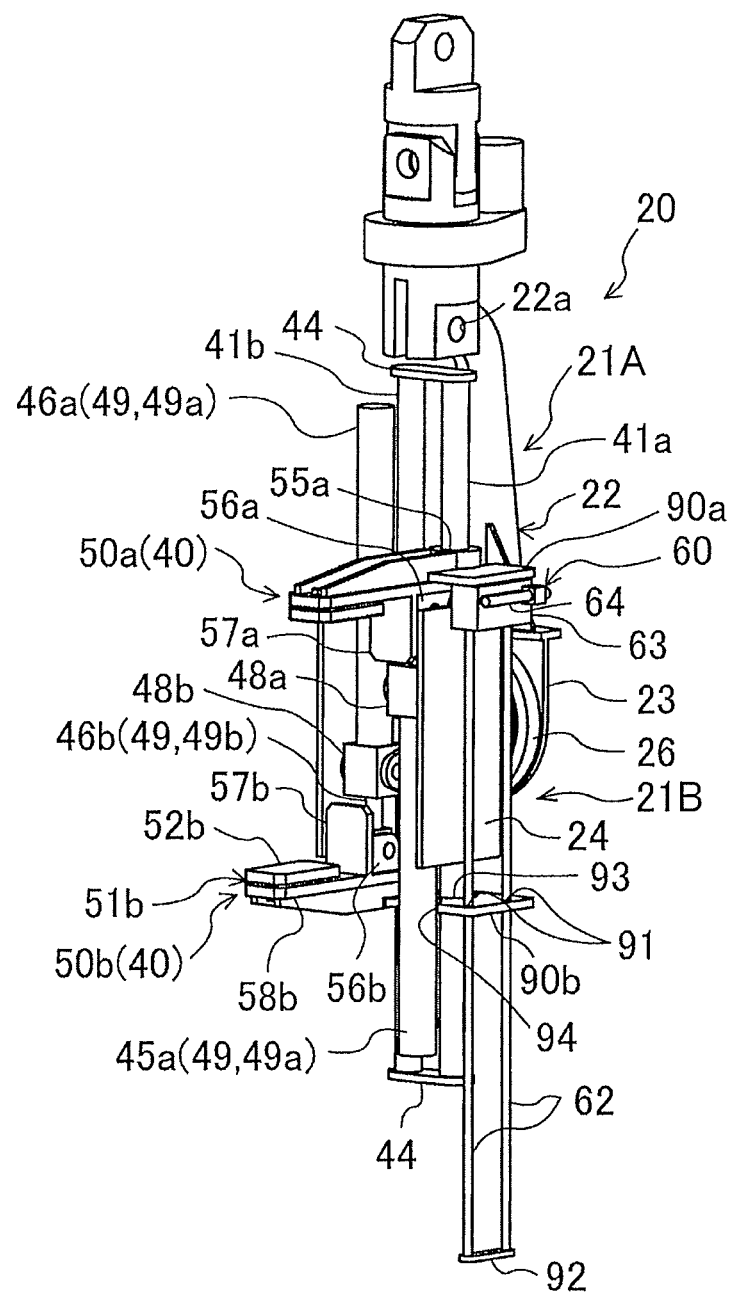
FIG. 14 is a perspective view of a grasp unit and a cutting unit of a cutting device according to a fifth embodiment of the present invention.

Next will be described a fourth embodiment of the present invention with reference to FIGS. 13 and 14. The following description of a cutting device according to the fourth embodiment only deals with differences from the cutting device 20 according to the first embodiment.

The cutting device according to the fourth embodiment includes a first stopper 90a and a second stopper 90b as a position setting means for setting the cutting start position and the cutting end position of the cutting unit 60 to respective positions of the first and second graspers 50a and 50b that are grasping a cutting object T, respectively, in place of the first and second detectors 70a and 70b according to the first embodiment, that is, in place of the means for detecting the positions of the first and second graspers 50a and 50b that are grasping a cutting object T. The first and second stoppers 90a and 90b restrict the moving range of the cutting unit 60 within a range between the first and second graspers 50a and 50b that are grasping the cutting object T, thereby setting the cutting start position and the cutting end position to respective positions of the first and second graspers 50a and 50b, respectively.

The cutting device according to the fourth embodiment does not include the box 61 according to the first embodiment, and the first stopper 90a is secured to the first grasper 50a while the second stopper 90b is secured to the second grasper 50b. The first stopper 90a is secured to respective upper ends of a plurality of guide rails 62 supporting the first and second graspers 50a and 50b. The second stopper 90b includes a plurality of slide holes 91, through which the guide rails 62 vertically pass, respectively, to thereby allow respective inner circumferential surfaces of the second stopper 90b defining the slide hole 91 to slide against and along the guide rails 62. The plurality of guide rails 62 shares a stoppage piece 92, which is secured to respective lower ends of the guide rails 62 to prevent the second stopper 90b from slipping off the guide rails 62. A second main section 21B of the cutting device according to the fourth embodiment includes a torch holding section 63 that is similar to the torch holding section 63 according to the first embodiment, the torch holding section 63 of the fourth embodiment being disposed across the plurality of guide rails 62 to be movable in the opening and closing directions of the first and second graspers 50a and 50b. In addition, the upper limit position of the torch holding section 63 and a torch section 64 held thereon, namely, the cutting start position, is defined by contact of the torch holding section 63 with a lower surface of the stopper 90a as shown in FIGS. 13 and 14, while the lower limit position of the torch holding section 63 and the torch section 64 held thereon, namely, the cutting end position, is defined by contact of the torch holding section 63 with an upper surface of the second stopper 90b.

The second stopper 90b includes a loose-fit hole 93 and a cutout 94. The loose-fit hole 93 has a shape of allowing the first guide shaft 41a located between the plurality of guide rails 62 and the second grasper 50b to loosely fit with the second stopper 90b moving together with the second grasper 50b to thereby prevent the second stopper 90b from interfering with the first guide shaft 41a. The cutout 94 has a shape of preventing the second stopper 90b during the above mentioned movement from interfering with the first hydraulic cylinder 45a.

In the cutting device according to the fourth embodiment, the first and second stoppers 90a and 90b move involved by respective movements of the first and second graspers 50a and 50b in the respective closing directions of coming close to each other. Specifically, as shown in FIG. 14, accompanying a downward movement of the first grasper 50a and the first stopper 90a secured thereto, the plurality of guide rails 62 having respective upper ends secured to the second stopper 90a pass downward through the slide holes 91 of the second stopper 90b, and the second stopper 90b secured to the second grasper 50b moves upward while being guided along the guide rails 62, causing a part of the guide rails 62 to protrude downward beyond the stopper 90b. Thus, with decrease in the distance between first and second graspers 50a and 50b in the opening and closing directions decreases, the distance between the first and second stoppers 90a and 90b in the opening and closing directions is also decreased. The first and second stoppers 90a and 90b prevent the cutting unit 60 from movement beyond the first and second stoppers 90a and 90b to thereby restricting the moving of the cutting unit 60 within the range between the first and second stoppers 90a and 90b, that is, the range between the first and second graspers 50a and 50b, suppressing undesired movement of the cutting unit 60.

The position setting means for setting the cutting start position and the cutting end position of the cutting unit 60 may include only one of the first and second stoppers 90a and 90b. Also in this case, the position setting means can set either the cutting start position or the cutting end position to the position of the one stopper and define the other position through measurement or inference.

The first and second stoppers 90a and 90b make it possible to set the cutting start position and the cutting end position structurally with no need for the first and second detectors 70a and 70b according to the first embodiment. Hence, the first and second stoppers 90a and 90b according to the fourth embodiment also form the position setting means for setting the cutting start position and the cutting end position to the positions of the first and second graspers 50a and 50b that are grasping the cutting object T, respectively.

The above-described fourth embodiment is not intended to exclude simultaneous use of at least one of the first and second stoppers 90a and 90b and a detector. For example, it is also permissible to provide one of the graspers 50a and 50 with a stopper while providing the other with a detector.

The present invention is not limited to the above-described embodiments. The present invention also encompasses, for example, the following embodiments.

(A) Regarding Detector

Although the first embodiment includes the first and second detectors 70a and 70b which are provided to the first and second graspers 50a and 50b, respectively, the detector according to the present invention may be configured to directly detect only the position of one of the first and second graspers and infer the position of the other grasper. Such detector also enable the cutting start position and end position to be set.

It is also possible to detect respective movement amounts of the first and second graspers 50a and 50b and the dimension of the cutting object T in the opening and closing directions without direct detection of the positions of the first and second graspers 50a and 50b that have been moved, because respective strokes of the first and second rods 46a, 46b can be calculated based on the amount of hydraulic fluid supplied to the first and second hydraulic cylinder 45a, 45b respectively. Based on the detected information, respective positions at which the cutting should be started and ended can be obtained, enabling the cutting unit 60 to be set to the cutting start position corresponding to the position of the first grasper 50a.

Modified Embodiments

While the cutting start position and the cutting end position of the cutting unit 60 according to the above-described first embodiment are set based on the moving distance of the grasp unit 40, the method for setting the cutting start position and the cutting end position is not limited. For example, the first embodiment may be modified to include a switch configured to be activated to perform a switching action for cutting start or cutting end of the cutting operation when the cutting unit 60 on the plurality of guide rails reaches respective positions corresponding to the first grasper and the second grasper that are grasping the target objet T. For example, it is also possible to provide the first and second graspers 50a and 50b with respective proximity sensors or like and to set the cutting start position and end position based on the position of the cutting unit 60 at the time when it passes through each of the proximity sensors.

In the present invention, the position setting means capable of setting the cutting start position and the cutting end position without a detector is not limited to the first and second stoppers 90a and 90b according to the fourth embodiment. Any configuration including restriction means that allows the cutting unit to move freely between the first and second graspers but prevents the cutting unit from moving beyond the first or second grasper enables the cutting start position and the cutting end position to be set to respective positions of the first and second graspers.

The cutting method according to the present invention may include swinging the arm 12 in the left and right directions (in the direction orthogonal to the drawing sheet surface of FIG. 1) depending on the shape and position of the cutting object T to thereby move the cutting device 20 to a position facilitating the grasping of the cutting object T, after which the operation of the cutting device 20 should be started.

The cutting device according to the present invention is not necessarily mounted on the above-described demolition machine 1. The cutting device may be mounted, for example, on a crane, or may be directly mounted to the distal end of the boom 6 shown in FIG. 1.

The place where the remote control of the cutting device 20 should be performed by an operator is not limited to the cab 4. The remote control of the cutting device according to the present invention may be performed outside a construction machine.

The cutting unit according to the present invention is not limited to those that perform fusion cutting with a gas torch like the above-described cutting unit 60. The cutting unit may be configured to perform fusion cutting through plasma or laser. Alternatively, may be used one that cuts a cutting object by means other than fusion cutting, for example, a mechanical cutting machine such as a high speed cutter.

As described above, provided are a device and a method capable of cutting a cutting object efficiently.

Provided is a cutting device for cutting a cutting object included in a structure, the cutting device comprising: a grasp unit including a first grasper and a second grasper that are movable in an opening and closing directions, in which direction the first grasper and the second grasper come close to each other or go away from each other, to grasp the cutting object therebetween in the opening and closing directions; a drive mechanism that moves the first grasper and the second grasper relatively to each other in the opening and closing directions; a cutting unit disposed side by side with the first grasper and the second grasper and configured to cut the cutting object with a movement of the cutting unit in a cutting direction along with the opening and closing directions; a main unit supporting the first and second graspers movably in the opening and closing directions and supporting the cutting unit movably in the cutting direction; a feed mechanism that moves the cutting unit in the opening and closing directions; and a position setting means that sets a cutting start position and a cutting end position based on respective positions of the first grasper and the second grasper that are grasping the cutting object, respectively. The cutting start position is a position at which an operation of the cutting unit and the movement of the cutting unit for cutting the cutting object are started, and the cutting end position is a position at which the operation of the cutting unit and the movement of the cutting unit for cutting the cutting object are ended. The limitation "sets a cutting start position and a cutting end position based on respective positions of the first grasper and the second grasper" does not necessarily require that the cutting start position exactly agrees with the position of the first grasper and the cutting end position exactly agrees with the position of the second grasper, but encompasses the aspect to set the cutting start position to allow the operation of the cutting unit is started at a position slightly before the position of the first grasper and the aspect to set the cutting end position to allow the operation of the cutting unit to be stopped at a position slightly ahead of the position of the second grasper.

The position setting means according to this cutting device, setting the cutting start position and the cutting end position based on respective positions of the first grasper and the second grasper that are grasping the cutting object, respectively, make it possible to cut the cutting object efficiently with no need for a complex structure.

It is preferable that the position setting means includes, for example, a detector that detects positional information of at least one of the first grasper and the second grasper that are grasping the cutting object, the position setting means being configured to set the cutting start position and the cutting end position based on the positional information detected by the detector.

The position setting means can set the cutting start position and the cutting end position appropriately, based on the actual positional information of the first and second graspers detected by the detector.

Alternatively, it is preferable that the position setting means includes a stopper provided for at least one of the first grasper and the second grasper, the stopper being coupled to the one grasper so as to be moved together with the one grasper in the opening and closing directions and configured to prevent the cutting unit, by contact of the stopper with the cutting unit, from moving beyond a position corresponding to the one grasper.

With the movement together with one of the first grasper and the second grasper and contact with the cutting unit, the stopper enables at least one of the cutting start position and the cutting end position to be set to the position corresponding to the one grasper without actually detecting the position of the one grasper.

It is preferable that the cutting device further includes a displacement mechanism that displaces the cutting unit relatively to the main unit in an intersecting direction that intersects the cutting direction, the cutting unit coming close to the cutting object and going away from the cutting object in the intersecting direction.

The displacement mechanism allows the distance between the cutting unit and the cutting object to be adjusted with no need for movement of the main unit, thereby enabling the cutting operation to be performed more efficiently.

It is preferable that the cutting device further includes a tilting mechanism that tilts the cutting unit with respect to the main unit in the cutting direction so as to bring a distal end of the cutting unit away from a reference axis orthogonal to the cutting direction.

The tilting mechanism allows the tilt of the cutting unit relatively to the cutting object to be adjusted with no need for tilt of the main unit, thereby enabling the cutting operation to be performed more efficiently.

The drive mechanism preferably includes a first drive mechanism that moves the first grasper in the opening and closing directions and a second drive mechanism that moves the second grasper in the opening and closing directions independently of the first grasper.

The first drive mechanism and the second drive mechanism, being capable of move the first grasper and the second grasper individually, enables the cutting object to be grasped efficiently and reliably.

It is preferable that at least one of the first grasper and the second grasper includes a base portion to be moved by the drive mechanism, a grasping contact portion capable of making direct contact with the cutting object, the grasp contact portion being mounted on the base portion on an inner side of the base portion in the opening and closing directions so as to be displaceable relatively to the base portion in the opening and closing directions, and a biasing member that biases the grasping contact portion with respect to the base portion in a closing direction in which the first grasper and the second grasper come close to each other.

The biasing member, exerting a biasing force to the grasping contact portion in the closing direction to restrain the grasping contact portion from movement in an opening direction in which the first grasper and the second grasper go away from each other, enables the first and second graspers to grasp the cutting object more reliably.

It is preferable that the main unit includes a first main section, a second main section supporting the grasp unit and the cutting unit, and a turning mechanism coupling the second main section to the first main section so as to allow the second main section to turn about a turn axis extending in a front and rear direction orthogonal to the opening and closing directions, the front and rear direction being a direction toward and away from the cutting object, the turning mechanism being configured to turn the second main section relatively to the first main section.

The turning mechanism makes it possible to cope with a cutting object in any orientation, with no need for moving the first main section, by turning the grasp unit and the cutting unit together with the second main section about the turn axis extending in the front and rear direction depending on the orientation of the cutting object, such as the direction in which a steel member extends.

It is preferable that the cutting device further includes a position adjustment mechanism that adjusts a midway position between the first and second graspers relative to the second main section so as to allow the first and second graspers to grasp the cutting object regardless of the relative position of the main unit to the cutting object.

The position adjustment mechanism allows the first and second graspers to stably grasp the cutting object even when the first grasper and the second grasper come into contact with the cutting object at different timings depending on a relative position of the main unit to the cutting object, through adjusting the midway position between the first and second graspers so as to allow the first and second graspers to properly grasp the cutting object to thereby prevent an uneven load from acting on the cutting device.

Also provided is a method for cutting a cutting object included in a structure by using a cutting device, the method comprising: a cutting device preparation step of preparing the cutting device that includes a grasp unit including a first grasper and a second grasper that are movable in an opening and closing directions, in which direction the first grasper and the second grasper come close to each other or go away from each other, to grasp the cutting object therebetween in the opening and closing directions, a drive mechanism that moves the first grasper and the second grasper relatively to each other in the opening and closing directions, a cutting unit disposed side by side with the first grasper and the second grasper to cut the cutting object with a movement of the cutting unit in a cutting direction along with the opening and closing directions, a main unit supporting the first and second graspers movably in the opening and closing directions and supporting the cutting unit movably in the cutting direction, and a feed mechanism that moves the cutting unit in the opening and closing directions; a grasp unit positioning step of positioning the cutting device to locate the cutting object between the first grasper and the second grasper; a grasping step of moving the first grasper and the second grasper relatively to each other in a closing direction that is one of the opening and closing directions, the first grasper and the second grasper coming close to each other in the closing direction, to thereby cause the first grasper and the second grasper to grasp the cutting object; a position setting step of setting a cutting start position based on the position of the first grasper and setting a cutting end position based on the position of the second grasper when the first grasper and the second grasper are grasping the cutting object; a cutting unit positioning step of causing the feed mechanism to move the cutting unit in the opening and closing directions to position the cutting unit at the cutting start position; and a cutting step of moving the cutting unit from the cutting start position to the cutting end position to cut the cutting object.

The above method, including setting the cutting start position and the cutting end position based on the positions of the first and second graspers that are grasping the cutting object and cutting the cutting object while moving the cutting device from the thus set cutting start position to the cutting end position in the cutting direction along with the opening and closing directions of the first and second graspers, makes it possible to efficiently cut the cutting object with no need for a complex structure.

It is preferable that the cutting unit positioning step includes displacing the cutting unit relatively to the main unit in an intersecting direction which intersects the cutting direction, the intersecting direction being a direction in which the cutting unit comes close to and away from the cutting object. This makes it possible to adjust the distance between the cutting unit and the cutting object easily, thereby enabling the cutting operation to be performed more efficiently.

It is preferable that the cutting unit positioning step includes tilting the cutting unit with respect to the main unit in the moving direction of the cutting unit so as to bring a distal end of the cutting unit away from a reference axis orthogonal to the cutting direction. This makes it possible to adjust the tilt of the cutting unit with respect to the cutting object easily, thereby enabling the cutting operation to be performed more efficiently.

It is preferable that the position setting step includes, for example, detecting a position of at least one of the first grasper and the second grasper that are grasping the cutting object, setting the cutting start position to a position corresponding to the position of the first grasper, and setting the cutting end position to a position corresponding to the second grasper, based on the detected position. Thus detecting the position of at least one of the first grasper and the second grasper and setting the cutting start position and the cutting end position to respective positions corresponding to the first grasper and the second grasper, respectively, based on the detected positional information enables the cutting start position and the cutting end position to be set to proper positions more reliably.

The position setting step, alternatively, may include providing a stopper for at least one of the first grasper and the second grasper to couple the stopper to the one grasper so as to cause the stopper to be moved together with the one grasper in the opening and closing directions and preventing the cutting unit, by contact of the stopper with the cutting unit, from moving beyond a position corresponding to the one grasper. This makes it possible to set at least one of the cutting start position and the cutting end position to the position corresponding to the one grasper with no need for actually detecting the position of the one grasper.

In the above method, it is preferable that the cutting device preparation step includes the cutting device in which the main unit includes a first main section and a second main section supporting the grasp unit and the cutting unit, the second main section being coupled to the first main section turnably about a turn axis extending in a front and rear direction orthogonal to the opening and closing directions, the front and rear direction being a direction toward and away from the cutting object, and the grasp unit positioning step includes turning the grasp unit together with the second main section relatively to the first main section. This makes it possible to cope with a cutting object in any orientation by turning the grasp unit easily about the turn axis depending on the orientation of the cutting object, such as the direction in which a steel member extends.

The invention claimed is:

1. A cutting device for cutting a cutting object included in a structure, the cutting device comprising:
    a grasp unit including a first grasper and a second grasper that are movable in an opening and closing directions, in which direction the first grasper and the second grasper come close to each other or go away from each other, to grasp the cutting object therebetween in the opening and closing directions;
    a drive mechanism that moves the first grasper and the second grasper relatively to each other in the opening and closing directions;
    a cutting unit disposed side by side with the first grasper and the second grasper and configured to cut the cutting object with a movement of the cutting unit in a cutting direction along with the opening and closing directions;
    a main unit supporting the first and second graspers movably in the opening and closing directions and supporting the cutting unit movably in the cutting direction;
    a feed mechanism that moves the cutting unit in the opening and closing directions; and
    a position setting means that sets a cutting start position and a cutting end position based on respective positions of the first grasper and the second grasper that are grasping the cutting object, respectively, the cutting start position being a position at which an operation of the cutting unit and the movement of the cutting unit for cutting the cutting object are started, the cutting end position being a position at which the operation of the cutting unit and the movement of the cutting unit for cutting the cutting object are ended,
    wherein the position setting means includes a stopper provided for at least one of the first grasper and the second grasper, the stopper being coupled to the one grasper so as to be moved together with the one grasper in the opening and closing directions and configured to prevent the cutting unit, by contact of the stopper with the cutting unit, from moving beyond a position corresponding to the one grasper.

2. The cutting device according to claim 1, wherein the position setting means includes a detector that detects positional information of at least one of the first grasper and the second grasper that are grasping the cutting object, the position setting means being configured to set the cutting start position and the cutting end position based on the positional information detected by the detector.

3. The cutting device according to claim 1, further comprising a displacement mechanism that displaces the cutting unit relatively to the main unit in an intersecting direction that intersects the cutting direction, the cutting unit coming close to the cutting object and going away from the cutting object in the intersecting direction.

4. The cutting device according to claim 1, further comprising a tilting mechanism that tilts the culling unit with respect to the main unit in the cutting direction so as to bring a distal end of the culling unit away from a reference axis orthogonal to the cutting direction.

5. The cutting device according to claim 1, wherein the drive mechanism includes a first drive mechanism that moves the first grasper in the opening and closing directions and a second drive mechanism that moves the second grasper in the opening and closing directions independently of the first grasper.

6. The cutting device according to claim 1, wherein at least one of the first grasper and the second grasper includes a base portion to be moved by the drive mechanism, a grasping contact portion capable of making direct contact with the cutting object, the grasp contact portion being mounted on the base portion on an inner side of the base portion in the opening and closing directions so as to be displaceable relatively to the base portion in the opening and closing directions, and a biasing member that biases the grasping contact portion with respect to the base portion in a closing direction in which the first grasper and the second grasper come close to each other.

7. A cutting device for cutting a cutting object included in a structure, the cutting device comprising:
    a grasp unit including a first grasper and a second grasper that are movable in an opening and closing directions, in which direction the first grasper and the second grasper come close to each other or go away from each other, to grasp the cutting object therebetween in the opening and closing directions;
    a drive mechanism that moves the first grasper and the second grasper relatively to each other in the opening and closing directions;
    a cutting unit disposed side by side with the first grasper and the second grasper and configured to cut the cutting object with a movement of the cutting unit in a cutting direction along with the opening and closing directions;

a main unit supporting the first and second graspers movably in the opening and closing directions and supporting the cutting unit movably in the cutting direction;

a feed mechanism that moves the cutting unit in the opening and closing directions; and a position setting means that sets a cutting start position and a cutting end position based on respective positions of the first grasper and the second grasper that are grasping the cutting object, respectively, the cutting start position being a position at which an operation of the cutting unit and the movement of the cutting unit for cutting the cutting object are started, the cutting end position being a position at which the operation of the cutting unit and the movement of the cutting unit for cutting the cutting object are ended, wherein the main unit includes a first main section, a second main section supporting the grasp unit and the cutting unit, and a turning mechanism coupling the second main section to the first main section so as to allow the second main section to turn about a turn axis extending in a front and rear direction orthogonal to the opening and closing directions, the front and rear direction being a direction toward and away from the cutting object, the turning mechanism being configured to turn the second main section relatively to the first main section.

8. The cutting device according to claim 7, further comprising a position adjustment mechanism that adjusts a midway position between the first and second graspers relative to the second main section so as to allow the first and second graspers to grasp the cutting object regardless of the relative position of the main unit to the cutting object.

* * * * *